(12) United States Patent
Kim et al.

(10) Patent No.: US 6,834,081 B2
(45) Date of Patent: Dec. 21, 2004

(54) CODING APPARATUS AND METHOD FOR ORIENTATION INTERPOLATOR NODE

(75) Inventors: Sung-jin Kim, Kyungki-do (KR);
Do-kyoon Kim, Kyungki-do (KR);
Seok-yoon Jung, Seoul (KR);
Sang-oak Woo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 552 days.

(21) Appl. No.: 09/981,962

(22) Filed: Oct. 19, 2001

(65) Prior Publication Data

US 2002/0071488 A1 Jun. 13, 2002

(30) Foreign Application Priority Data

Oct. 20, 2000 (KR) ........................................ 2000-61985
Jul. 7, 2001 (KR) ........................................ 2001-40705

(51) Int. Cl.[7] ............................................... H04N 7/12
(52) U.S. Cl. ............. 375/240.03; 375/240; 375/240.02; 375/240.12; 375/240.22; 375/240.26
(58) Field of Search ............................ 375/240, 240.01, 375/240.02, 240.03, 240.04, 240.05, 240.06, 240.07, 240.12, 240.22; 345/473; 328/240.26

(56) References Cited

U.S. PATENT DOCUMENTS 4,797,836 A * 1/1989 Witek et al. ................. 345/473
5,511,153 A * 4/1996 Azarbayejani et al. ...... 345/419
5,742,289 A   4/1998 Naylor et al.
6,084,908 A * 7/2000 Chiang et al. ......... 375/240.03
6,097,854 A * 8/2000 Szeliski et al. ............. 382/284
6,204,854 B1 * 3/2001 Signes et al. ............... 345/427
6,559,848 B2 * 5/2003 O'Rourke ................... 345/473

FOREIGN PATENT DOCUMENTS

FR       2786590 A1    6/2000

* cited by examiner

*Primary Examiner*—Chris Kelley
*Assistant Examiner*—Allen Wong
(74) *Attorney, Agent, or Firm*—Burns, Doane, Swecker & Mathis, L.L.P.

(57) ABSTRACT

An encoding apparatus and method for an orientation interpolator node are provided. The encoding apparatus for an orientation interpolator node, which provides information on the rotation of an object in a 3-dimensional space, includes a field data input unit for extracting field data to be encoded at present from a key which indicates information on a position on a time axis where a change of a rotational movement on a time axis occurs and key values which indicate rotation information corresponding to the position information, by parsing the orientation interpolator node; an adaptive differential pulse code modulation (ADPCM) processing unit for converting the key value data into a quaternion, and then ADPCM processing the quaternion using a rotation differential converting matrix, and differential pulse code modulation (DPCM) processing the key data; and a quantizing unit for quantizing the key data and key value data and outputting the quantized data.

25 Claims, 23 Drawing Sheets

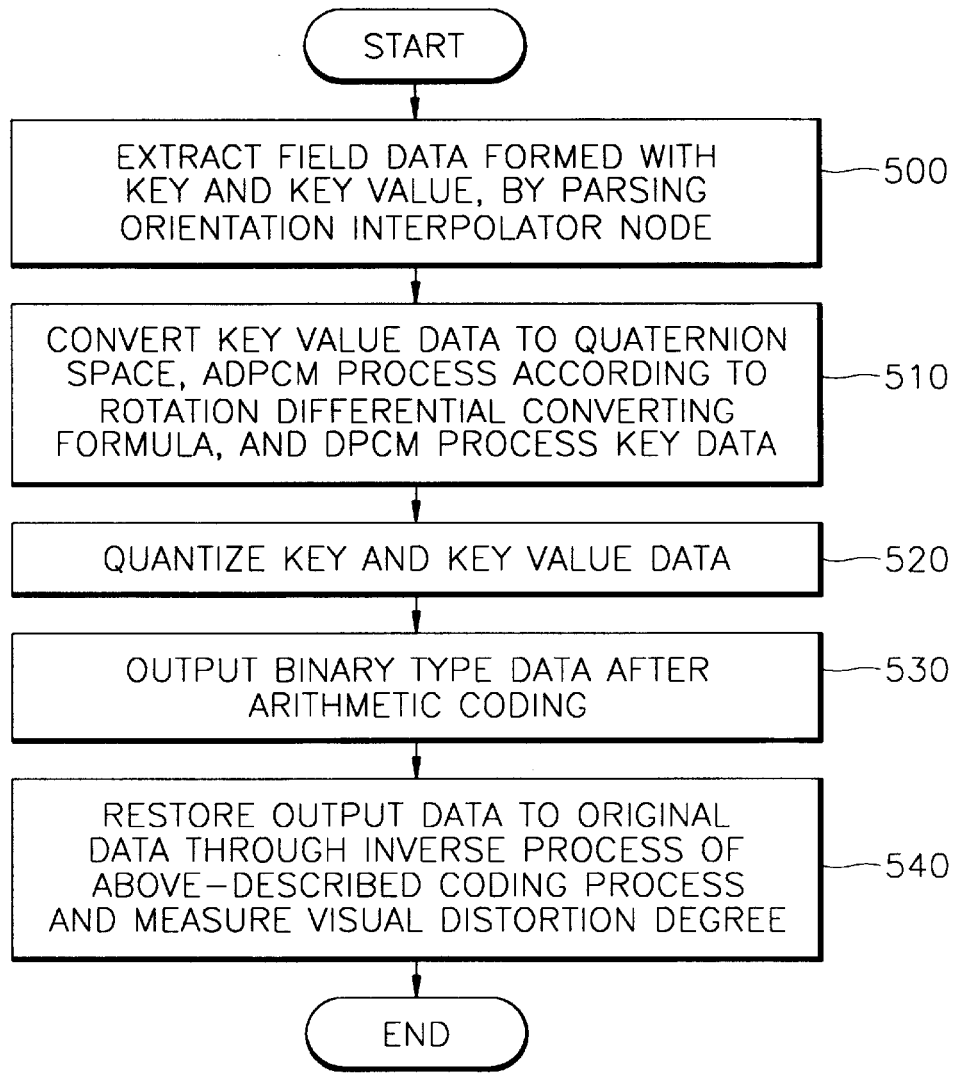
FIG. 5
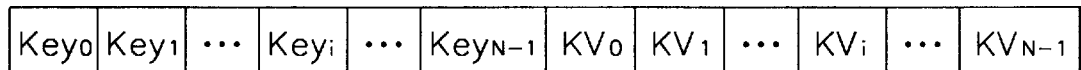
(a) STREAM STRUCTURE HAVING DELAY
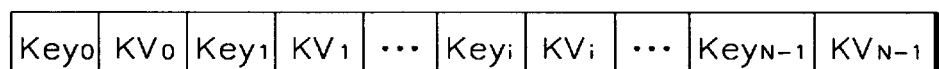
(b) STREAM STRUCTURE FOR REAL TIME PROCESSING

FIG. 7

(a) PRIOR ART MPEG-4 BIFS

| Class QuantizeField(FieldData field) { | Data Type | # of bits |
|---|---|---|
| switch (field.quantType) { | | |
| case 9 : | | |
| direction ; | int | 1 |
| case 10 : | | |
| orientation ; | int | 2 |
| default : | | |
| break ; | | |
| } | | |
| } | | |

(b) IMPROVED MPEG-4 BIFS

| Class QuantizeField(FieldData field) { | Data Type | # of bits |
|---|---|---|
| switch (field.quantType) { | | |
| case 9 : | | |
| direction ; | int | 1 |
| case 10 : | | |
| if(isFirstField) | | |
| orientation ; | int | 2 |
| default : | | |
| break ; | | |
| } | | |
| } | | |

FIG. 13

(a) PRIOR ART MPEG-4 BIFS

| Class QuantizeField(FieldData field) { | Data Type | # of bits |
|---|---|---|
| switch (field.quantType) { | | |
| case 9 : | | |
| direction ; | int | 1 |
| case 10 : | | |
| orientation ; | int | 2 |
| default : | | |
| break ; | | |
| } | | |
| } | | |

(b) IMPROVED MPEG-4 BIFS

| Class QuantizeField(FieldData field) { | Data Type | # of bits |
|---|---|---|
| switch (field.quantType) { | | |
| case 9 : | | |
| direction ; | int | 1 |
| case 10 : | | |
| default : | | |
| break ; | | |
| } | | |
| } | | |

FIG. 20A

| CompressedOrientationInterpolator () | No. of bits | Mnemonic |
|---|---|---|
| { | | |
| decodeAAC_start(); | | |
| nKeyQBit | 5 | uimsbf |
| nKeyValueQBit | 5 | uimsbf |
| nNumKeyCodingBit | 5 | uimsbf |
| nNumKey | D-32 | |
| nFirstQKey | nKeyQBit | |
| nKeyMin | nKeyQBit | |
| nKeyCodingBit | 5 | |
| m_dDPCMOrder | 1 | |
| if(m_dDPCMOrder == 0) | | |
| { | | |
| nSign | 1 | |
| nFirstQKV.s | nKeyValueQBit-1 | |
| nSign | 1 | |
| nFirstQKV.x | nKeyValueQBit-1 | |
| nSign | 1 | |
| nFirstQKV.y | nKeyValueQBit-1 | |
| nSign | 1 | |
| nFirstQKV.z | nKeyValueQBit-1 | |
| nKeyValueCodingBit[0] | 5 | |
| nKeyValueCodingBit[1] | 5 | |
| nKeyValueCodingBit[2] | 5 | |
| bytealigned(); | | |
| for(i = 0;i < nNumKey-1;i++) | | |
| { | | |
| decodeAAC(DeltaKey[i], Key_Context); | | vlclbf |
| } | | |

FIG. 20B

| CompressedOrientationInterpolator () | No. of bits | Mnemonic |
|---|---|---|
| for(i = 0;i < nNumKey-1;i++) | | |
| { | | |
| decodeAAC(DeltaKeyValue[i].x, KVX_context); | | vlclbf |
| } | | |
| for(i = 0;i < nNumKey-1;i++) | | |
| { | | |
| decodeAAC(DeltaKeyValue[i].y, KVY_context); | | vlclbf |
| } | | |
| for(i = 0;i < nNumKey-1;i++) | | |
| { | | |
| decodeAAC(DeltaKeyValue[i].z, KVZ_context); | | vlclbf |
| } | | |
| bytealigned(); | | |
| decodeAAC_finish(); | | |
| Inv_Quantize(nFirstQKey); | | |
| for(i = 1;i < nNumKey;i++) | | |
| { | | |
| Inv_Quantize(DeltaKey[i-1]); | | |
| } | | |
| Inv_Quantize(nFirstQKV); | | |
| for(i = 1;i < nNumKey;i++) | | |
| { | | |
| Inv_Quantize(DeltaKeyValue[i-1]); | | |
| } | | |
| } | | |
| else if(m_dDPCMOrder == 1) | | |
| { | | |
| nSign | 1 | |
| nFirstQKV.s | nKeyValue QBit-1 | |

FIG. 20C

| CompressedOrientationInterpolator () | No. of bits | Mnemonic |
|---|---|---|
| nSign | 1 | |
| nFirstQKV.x | nKeyValue QBit-1 | |
| nSign | 1 | |
| nFirstQKV.y | nKeyValue QBit-1 | |
| nSign | 1 | |
| nFirstQKV.z | nKeyValue QBit-1 | |
| nSign | 1 | |
| nSecondQKV.s | nKeyValue QBit-1 | |
| nSign | 1 | |
| nSecondQKV.x | nKeyValue QBit-1 | |
| nSign | 1 | |
| nSecondQKV.y | nKeyValue QBit-1 | |
| nSign | 1 | |
| nSecondQKV.z | nKeyValue QBit-1 | |
| if(nNumKey > 2) | | |
| { | | |
| nKeyValueCodingBit[0] | 5 | |
| nKeyValueCodingBit[1] | 5 | |
| nKeyValueCodingBit[2] | 5 | |
| } | | |
| bytealigned(); | | |
| for(i = 0;i < nNumKey-1;i++) | | |
| { | | |
| decodeAAC(DeltaKey[i], Key_Context); | | vlclbf |
| } | | |
| for(i = 0;i < nNumKey-2;i++) | | |

FIG. 20D

| CompressedOrientationInterpolator () | No. of bits | Mnemonic |
|---|---|---|
| { | | |
| decodeAAC(ReDPCMValue[i].x, KVX_context); | | vlclbf |
| } | | |
| for(i = 0;i < nNumKey-2;i++) | | |
| { | | |
| decodeAAC(ReDPCMValue[i].y, KVY_context); | | vlclbf |
| } | | |
| for(i = 0;i < nNumKey-2;i++) | | |
| { | | |
| decodeAAC(ReDPCMValue[i].z, KVZ_context); | | vlclbf |
| } | | |
| bytealigned(); | | |
| decodeAAC_finish(); | | |
| Inv_Quantize(nFirstQKey); | | |
| for(i = 1;i < nNumKey;i++) | | |
| { | | |
| Inv_Quantize(DeltaKey[i-1]); | | |
| } | | |
| decode_redpcm(nFirstQKV, nSecondQKV, ReDPCMValue, DeltaKey Value): | | |
| Inv_Quantize(DeltaKeyValue[0]); | | |
| for(i = 1;i < nNumKey;i++) | | |
| { | | |
| Inv_Quantize(DeltaKeyValue [i]); | | |
| } | | |
| } | | |
| } | | |

CODING APPARATUS AND METHOD FOR ORIENTATION INTERPOLATOR NODE

BACKGROUND OF THE INVENTION

1. Field of the Invention

The present invention relates to synthetic image encoding, and more particularly, to a coding apparatus and method for an orientation interpolator node.

2. Description of the Related Art

The MPEG-4 Binary Format for Scenes (BIFS), which is one of several international multimedia standards, supports key-frame-based animation representation technology among a variety of technologies for representing animation information used in a synthetic image. Data that forms key-frame-based animation is represented by keys and key values, which are expressed in interpolator node syntax in the MPEG-4 BIFS. In the MPEG-4 BIFS, a large amount of key and key value data is needed so as to provide smooth animation of key frames. A key frame consists of one key and one key value. A key which represents a specific time in which animation is expressed is a number between $-\infty$ and $\infty$ inclusive. Key values represent the information on the rotation of an object in a synthetic image in the time indicated by each key. The information on the rotation of the object in a time other than the time indicated by each key is obtained by interpolating between the key values corresponding to two keys: one indicating the closest previous time and the other indicating the closest next time. At this time, depending on the type of interpolator node, different interpolation methods are used.

One interpolation method using information on the rotation of an object expresses rotation information with rotation axes and a rotation angle. Like a Virtual Reality Modeling Language (VRML), the MPEG-4 BIFS supports rotation information, which is expressed with rotation axes and a rotation angle as described above, through an orientation interpolator node. That is, using an angle displacement expression method for expressing rotation axes and angle, the orientation interpolator node expresses rotation information and provides rotation information as key values. When key value data expresses smooth animation according to an interpolation characteristic, the distribution of difference values among successive key value sets is compact.

Therefore, it is efficient to use an encoding method using differential values among data sets. In the MPEG-4 BIFS, two representative methods are used for encoding field data which is represented by a key and key values of an orientation interpolator node and is to be processed: a method not using Differential Pulse Code Modulation (DPCM) and a method using the DPCM.

First, in the method not using the DPCM, only quantization is performed with respect to keys and key values of data to be encoded. Therefore, because the unique characteristics of data to be encoded is not considered, the method is inefficient. The method not using the DPCM will now be explained briefly. The field data of an orientation interpolator node is input and the key values of the field data are converted into values in a quaternion space. Next, the data precision of the key or key values are adjusted and the key and key values are quantized. Then the quantized field data is output as binary format data. Next, in order to check the quantization result, the output binary format data is restored to field data by inverse quantization, and each restored quaternion value is mapped to a key value format that is formed of rotation axes and a rotation angle. Next, the restored field data of the orientation node is stored and output to a screen. Also, using the data, the visual distortion of a quantization error is measured. The distortion D might be measured by the following equation 1:

$$D = \sqrt{\left(\sum_{i=0}^{i<N} (\varepsilon_i)^2\right)/N} = \sqrt{\left(\sum_{i=0}^{i<N} (Q_i - \tilde{Q}_i)^2/N\right)} \quad (1)$$

Here, N represents the number of field data, $\varepsilon_i$ represents the difference between a value ($Q_i$) to be encoded at present and a restored value ($\tilde{Q}_i$).

Next, the method using DCPM considers the correlation among consecutive data sets and therefore can improve encoding efficiency more than the method not using DCPM. The differences between the two methods will now be explained briefly. In the method using DCPM, the difference value between previously restored key values and a value to be encoded at present is calculated before quantization, and the difference value is quantized. By doing so, data characteristics occurring in this differentiation improve encoding efficiency, to some degree.

FIG. 1 is a block diagram for explaining the general principle of the DPCM.

A DPCM unit 100 calculates the difference value ($E_i$) between a value ($Q_i$) to be encoded at present and a restored value ($\check{Q}_{i-1}$), using an adder 102. The calculated value is quantized in a quantizer 120. The quantized value ($\hat{E}_i$) is sent to a destination and to an inverse quantizer 140 by which the quantized value ($\hat{E}_i$) is inverse quantized ($\check{E}_i$).

However, in an Orientation Interpolator which interpolates between continuous key values by spherical linear interpolation, the DPCM method shown in FIG. 1 cannot have a high efficiency. This can be found when key values which determine the rotation position of an object are analyzed in a quaternion space.

One key value (q) which determines the rotation position of an object in a 3-dimensional space is expressed as a combination of rotation axes and a rotation angle. In the following equations 2, equation (aa) shows how the Orientation Interpolator expresses a key value and equation (bb) is an equation for converting the key value into a quaternion.

$$(aa) \; (\vec{r}, \theta) = (n_x, n_y, n_z, \theta) \; (0 \leq \theta \leq \pi)$$

$$(bb) \quad q = \left(\cos\frac{\theta}{2}, \frac{n_x}{\|n\|}\sin\frac{\theta}{2}, \frac{n_y}{\|n\|}\sin\frac{\theta}{2}, \frac{n_z}{\|n\|}\sin\frac{\theta}{2}\right). \quad (2)$$

As shown in equation (bb), if rotation axis vectors and rotation angles of two quaternions have the same absolute values and opposite signs in the quaternion space, the two quaternions are the same. This means that in the physical aspect, two rotation transformations are the same and the factors affecting a rotation transformation are the rotation axis direction and rotation angle, and not the rotation axis vectors. Therefore, the quaternion expression which represents the rotation transformation of an object successfully expresses the rotation axis direction and rotation angle which are factors affecting the rotation transformation.

Meanwhile, the DPCM method of FIG. 1, in which equation (aa) is used for calculating time differential values between key values indicating rotation transformations, considers the difference between rotation axis vectors, and therefore does not show correlation of changes in rotation axis directions with respect to time changes and encoding efficiency is lowered.

SUMMARY OF THE INVENTION

To solve the above problems, it is a first objective of the present invention to provide a coding apparatus and method for an orientation interpolator node, in which by encoding the field data of an orientation interpolator node through adaptive DPCM processing using a rotation differential matrix conversion, data redundancy in a time region is removed, bit redundancy between symbols, which are quantized through additional arithmetic encoding, is removed, and additional information for elements is removed, with reflecting the physical characteristics of rotational and translational movement in a quaternion space, so that the efficiency of data transmission is improved and the degree of visual quality distortion is more objectively measured.

To accomplish the first objective of the present invention, there is provided an encoding apparatus for an orientation interpolator node which provides information on the rotation of an object in a 3-dimensional space, the encoding apparatus including a field data input unit for extracting field data to be encoded at present from a key which indicates information on a position on a time axis where a change of rotational and translational movement occurs and key values which indicate rotation information corresponding to the position information, by parsing the orientation interpolator node; an adaptive differential pulse code modulation (ADPCM) processing unit for converting the key value data into a quaternion, and then ADPCM processing the quaternion using rotation differentiation, and differential pulse code modulation (DPCM) processing for the key data; and a quantizing unit for quantizing the key data and key value data and outputting the quantized data To accomplish the second objective of the present invention, there is provided an encoding method for an orientation interpolator node which provides information on the rotation of an object in a 3-dimensional space, the encoding method having the steps of (a) extracting field data to be encoded at present from a key which indicates information on a position on a time axis where a change of rotational and translational movement occurs and key values which indicate rotation information corresponding to the position information, by parsing the orientation interpolator node; (b) converting the key value data into a quaternion, and then adaptive differential pulse code modulation (ADPCM) processing the quaternion using a rotation differential converting matrix, and differential pulse code modulation (DPCM) processing the key data; and (c) quantizing the key data and key value data and outputting the quantized data.

BRIEF DESCRIPTION OF THE DRAWINGS

The above objects and advantages of the present invention will become more apparent by describing in detail preferred embodiments thereof with reference to the attached drawings in which:

FIGS. 2 through 7 are diagrams for explaining a first preferred embodiment of the present invention; and FIGS. 8 through 22 are diagrams for explaining a second preferred embodiment of the present invention.

DESCRIPTION OF THE PREFERRED EMBODIMENTS

The present invention relates to an encoding apparatus and method which can improve the efficiency of data transmission by raising redundancy of key values using a quaternion representation method and data characteristics of an orientation interpolator node for providing information on the rotation of an object. Also, an error measuring method which can objectively measure the degree of visual distortion caused by an error occurring in compressing data is provided.

Figure 1:
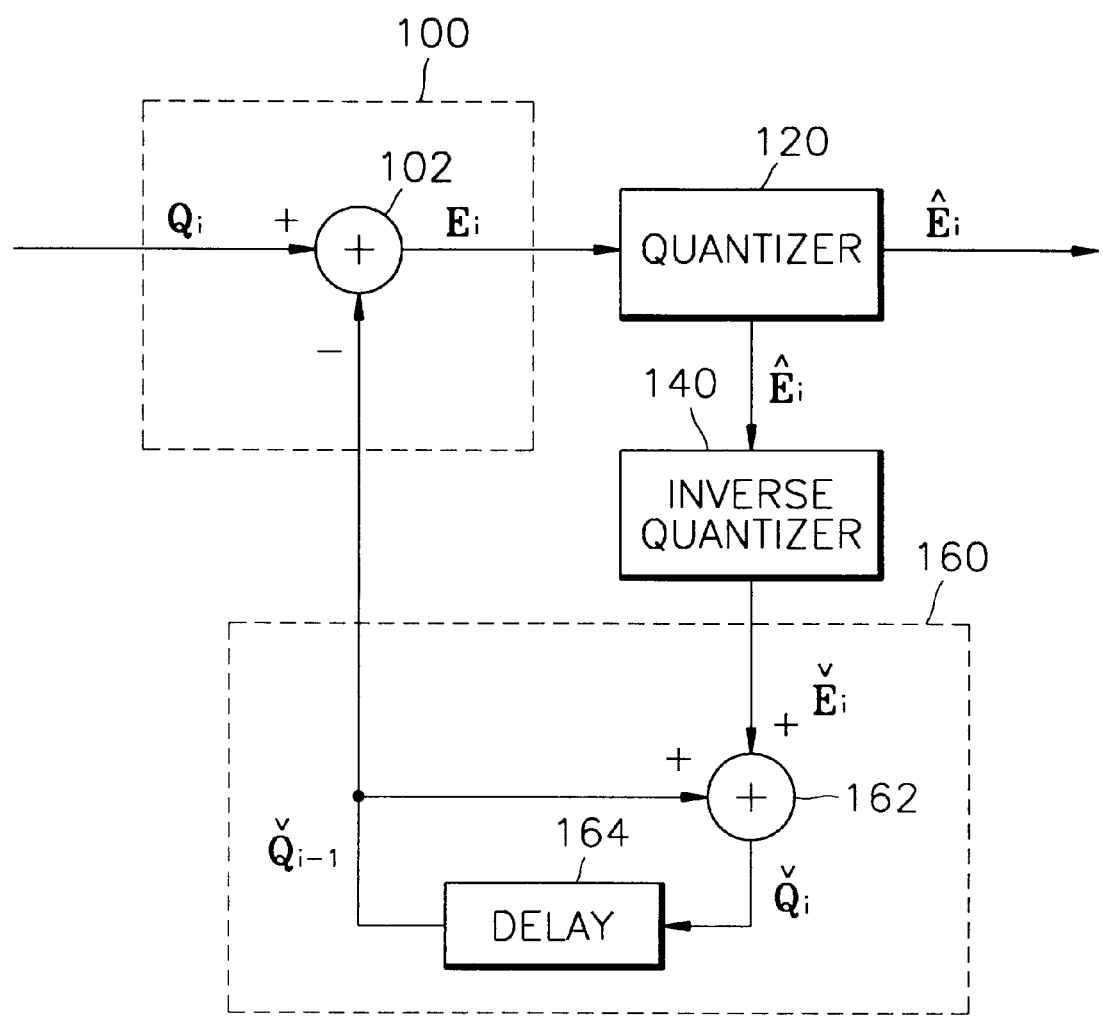
FIG. 1 is a block diagram for explaining the general principle of differential pulse code modulation (DPCM)
Figure 2:
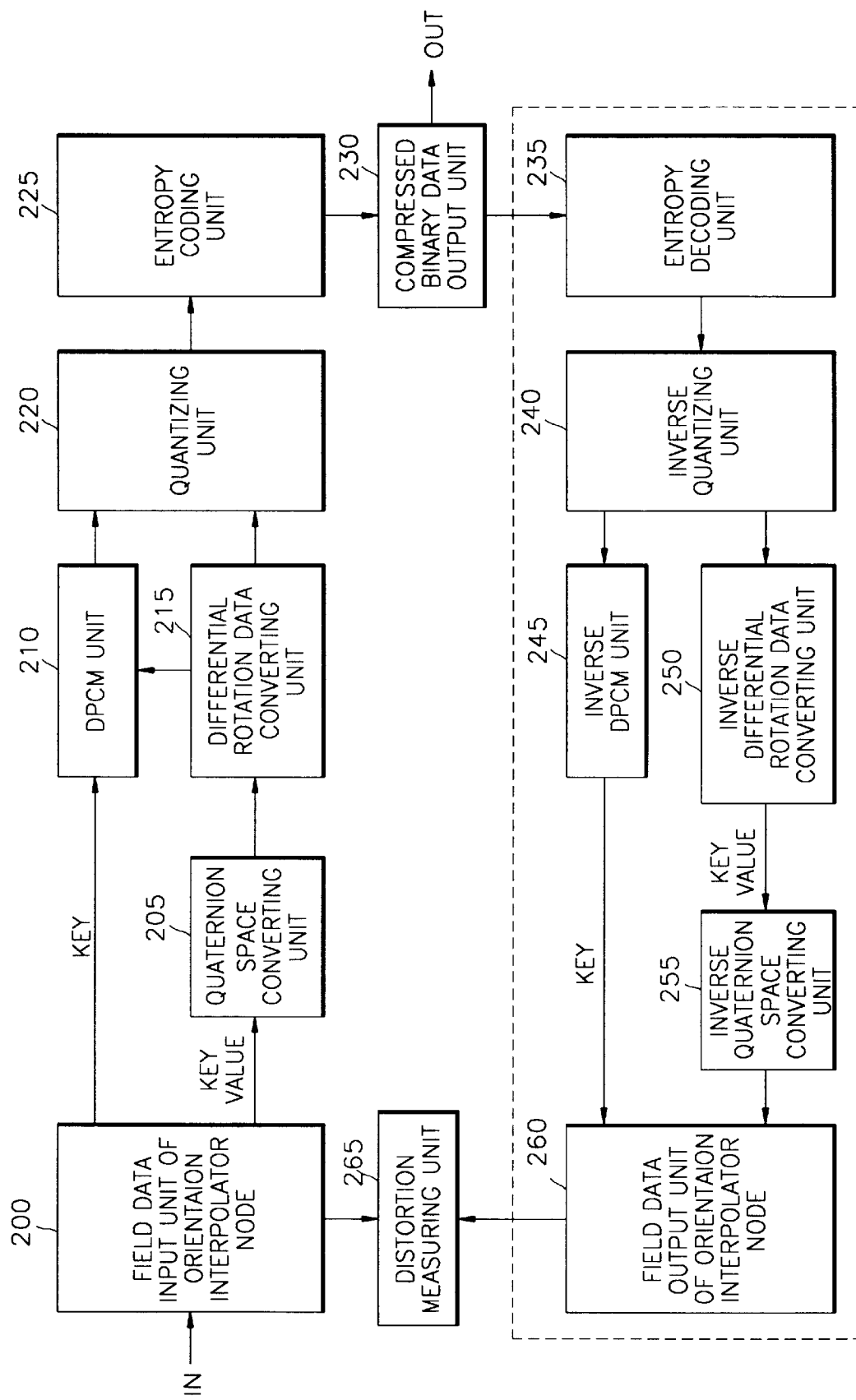

FIG. 2 is a schematic block diagram of an encoding apparatus of an orientation interpolator node according to a first preferred embodiment of the present invention.

The encoding apparatus according to the present invention includes a field data input unit of an orientation interpolator node 200, an adaptive DPCM processing unit for field data, a quantizing unit 220, a compressed binary field data output unit 230, and additionally an entropy encoding unit 225. Here, the adaptive DPCM processing unit includes a quaternion converting unit 205, a DPCM unit 210, and a rotation differential converting unit 215. The encoding apparatus also includes a decoding unit so as to check the restoration result of output data on a screen and measure the degree of visual distortion due to quantization error. The decoding unit includes an entropy decoding unit 235, an inverse quantizing unit 240, an inverse DPCM unit 245, an inverse rotation differential converting unit 250, an inverse quaternion converting unit 255, a field data output unit of a restored orientation interpolator node 260, and a distortion measuring unit 265.

FIG. 5 is a flowchart for explaining an encoding method of an orientation interpolator node according a first preferred embodiment of the present invention. Referring to FIGS. 2 and 5, the operation of the encoding apparatus of the present invention will now be explained.

First, field data of an orientation interpolator node to be encoded is input in step 500. More specifically, the field data input unit 200 parses an orientation interpolator node in input VRML data, and extracts field data which is formed with a key and key values. The key indicates information on a position on a time axis at which a change of a rotational and translational movement occurs. The key values indicates rotation information corresponding to the position information.

Next, key value data is converted into a quaternion space, and then Adaptive DPCM (ADPCM) processed according to a rotation differential converting equation, and key data is DPCM processed in step 510. More specifically, redundancy among data regarding key value data ($KV_i$, $0 \leq i \leq N-1$) which is extracted in the field data input unit 200 is removed and the precision of data representation is adjusted. In particular, in the present invention, key value data is sent to the quaternion converting unit 205 before ADPCM processing. The quaternion converting unit 205 converts key value data, that is, rotation information, into a quaternion space represented by one real number (a rotation angle) and three imaginary numbers (rotation axes). Next, the rotation differential converting unit 215 calculates a rotation differential between the current key value and the previous key value input from the quaternion converting unit 205.

In the prior art DPCM of key value data, in calculating a rotational movement distance from a current position p of an object to a position q of the object after a rotational movement, the value of the rotational movement distance is defined by the difference value between each element formed of rotation axes and a rotation angle. When only the difference value is considered, redundancy of data to be encoded is lowered, and physical characteristics of the movement of the object cannot be expressed. Therefore, it is difficult to measure visual effects of an encoding error. Also, from the aspect of data restoration, in order to express the element among all key value data which has the greatest value, 2-bit long information is additionally transmitted from an encoding apparatus to a decoding apparatus as shown in FIG. 7a.

Figure 3:
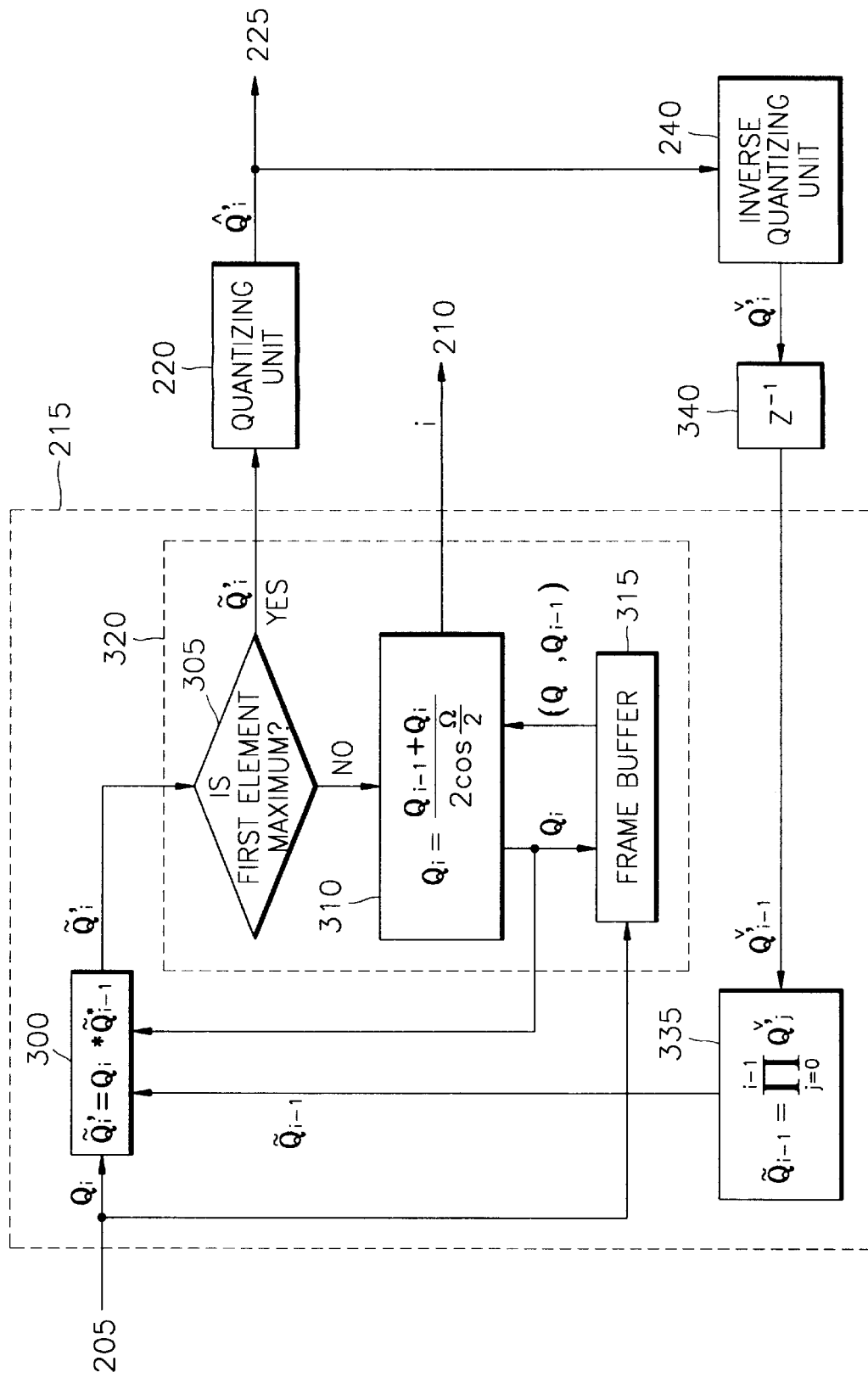

Therefore, in the present invention, in order to encode a rotational movement distance between key values of orientation interpolator nodes, a processing method that is different from the prior art DPCM is implemented through the rotation differential converting unit 215. Based on the fact that the rotation of an object in a quaternion space is described by a combination of rotation axes and a rotation angle, the rotation differential converting unit 215 is constructed, for example, as shown in FIG. 3, so that the rotational movement distance with respect to a real rotational movement path can also be defined by a rotation differential converting matrix using rotation axes and a rotation angle.

The principle of the rotation differential converting matrix used in the rotation differential converting unit 215 will now be explained.

Assuming that $\vec{x}$ denotes the current position vector of an object, $(\vec{n}_{i-1}, \theta_{i-1})$ denotes key values (key_value) when a key satisfies key=$k_{i-1}$, and $\vec{y}_{i-1}$ denotes a displacement vector of $\vec{x}$ in rotational movement of the object, a rotational movement equation in a quaternion space is expressed as the following equation 3:

$$Y_{i-1} = Q_{i-1} * X * Q^*_{i-1} \quad (3)$$

Here, X, $Y_{i-1}$, and $Q_{i-1}$ are quaternion expressions of $\vec{x}$, $\vec{y}$, and $(\vec{n}_{i-1}, \theta_{i-1})$, respectively.

In the same manner, when key=$k_i$, the rotational movement equation in a quaternion space is expressed as the following equation 4:

$$Y_i = Q_i * X * Q^*_i \quad (4)$$

From equations 3 and 4, a matrix equation for obtaining a rotation differential value is derived as the following equation 5:

$$Y_i = Q_i * X * Q^*_i = Q_i * Q_{i-1} * Y_{i-1} * Q_{i-1} * Q_i = Q'_i * Y_{i-1} * Q'_i \quad (5)$$

Therefore, a quaternion converting rotation differential matrix equation representing a rotation differential is defined as the following equation 6:

$$Q'_i = Q_i * Q^*_{i-1} \quad (6)$$

Referring to FIG. 3, based on these equations, the rotation differential converting unit 215 includes a rotation differential converting matrix generating unit 300, an element adjusting unit 320, an accumulating unit 335, and a delay unit 340. The rotation differential converting matrix generating unit 300 receives key value data which is converted into a quaternion space and is to be encoded at present, and defines a rotation differential converting matrix to be encoded at present as equation 6. The element adjusting unit 320 redefines the rotation differential converting matrix to be encoded at present so that a condition that in the rotation differential converting matrix (that is, rotation angles and rotation axes), which is formed of four elements (v[0], v[1], v[2], v[4]), the value of a first element (v[0]=cos (θ/2), Here, θ denotes a rotation angle) is always greater than any value of the remaining three elements is satisfied. In response to the output of the rotation differential converting unit 215, the delay unit 340 stores rotation differential converting matrices which are currently restored, and provides rotation differential converting matrices which were restored before. The accumulating unit 335 accumulates rotation differential converting matrices restored before by sequentially receiving previous rotation differential converting matrices from the delay unit 340, and outputs the result to the rotation differential converting matrix generating unit 300.

Figure 4:
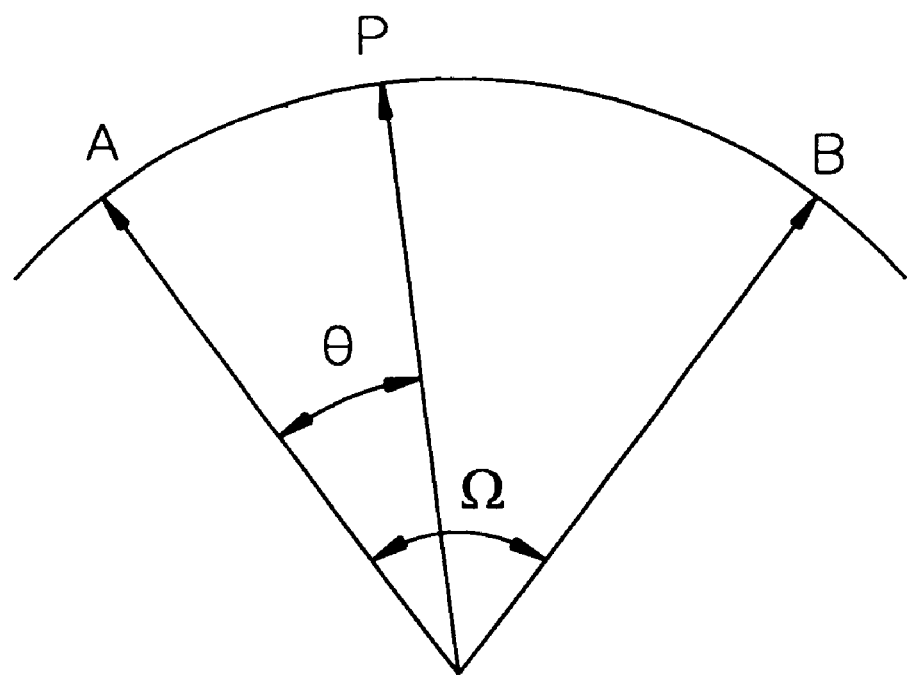

The element adjusting unit 320 uses the principle shown in FIG. 4 so that a condition that among four elements (v[0], v[1], v[2], v[3]) forming rotation information the value of the first element is always greater than any value of the remaining three elements is satisfied. That is, when an object moves from position A to position B and rotates Ω degrees in FIG. 4, if the first element among elements of a rotation differential converting matrix of this rotational movement does not satisfy the above-mentioned condition, a method of redefining a rotation differential converting matrix is used. In this method of redefining a position P (A<P<B, 0<θ<Ω) which is obtained when the object rotates θ degrees along a shortest movement path is arbitrarily defined so that the above-mentioned condition is satisfied.

Here, a method of comparing magnitudes of differences of two quaternion is used as a method for selecting a shortest movement path that occurs in a rotational and translational movement of the object. For example, rotational movement information on two arcs through which quaternion A of a starting position moves and rotates to quaternion B of the position after a rotational movement includes quaternion B and quaternion −B. At this time, A quaternion which produces the smallest value between the magnitude of difference from quaternion A to quaternion B and the magnitude of difference from quaternion A to quaternion −B is selected as one(in example, B) which has a shortest movement path. Therefore, a rotation differential converting matrix satisfying this shortest movement path satisfies the following equations 7:

$$|A| = |B| = |P| = 1 \quad (7)$$

$$A \cdot B = \cos\Omega$$

$$P = A\frac{\sin(\Omega - \theta)}{\sin\Omega} + B\sin\frac{\theta}{\sin\Omega}$$

In addition, if the position of point P is defined as in the middle of positions A and B (θ=Ω/2), a rotation differential converting matrix also satisfies the following equation 8:

$$P = \frac{A+B}{2\cos\frac{\Omega}{2}} \quad (8)$$

Therefore, if the first component ($q_0$) of the quaternion $Q(q_0, q_1, q_2, q_3)$ which is input from the rotation differential converting matrix generating unit 300 to a condition 305 in the element adjusting unit 320 is not the largest one among the four components, a key value generating unit 310 defines new key values from the previous key value and the current key value, that is, rotation information, so that the first element satisfies the condition 305 according to equation 8. At this time, the newly defined rotation information is stored in a frame buffer 315 and at the same time output to the rotation differential converting matrix generating unit 300. The frame buffer 315 stores key value data which is to be encoded at present. The frame buffer 315 sequentially stores key value data generated in the key value generating unit 310 and provides current and previous rotation information. Also, the frame buffer 315 provides θ, Ω, and a corresponding key value index to DPCM unit 210 in order to generate a key according to the generation of key values by θ. The following equation 9 describes key generation in the DPCM unit 210:

$$K_i = K_{i-1} + (K_i - K_{i-1}) * \frac{\theta}{\Omega} \quad (9)$$

Key data ($K_i$, $0 \leq i \leq N-1$) which is extracted in the field data input unit 200 is input to the DPCM unit 210. The DPCM unit 210 generates a new key also by the rotation differential converting unit 215. The DPCM unit 210 outputs first key data ($K_0$) without change, and outputs the remaining key data by calculating the difference value ($KD_i$) between the key ($K_{i-1}$) which was previously restored and the key ($K_i$) which is to be encoded at present. The DPCM unit 210 removes redundancy among data and adjusts precision of data representation so that a real compression process is performed.

As described above, by adjusting a first element value of a quaternion in the element adjusting unit 320 so that the first element value has the maximum value, 2-bit additional information, that is, information indicating which element is the maximum among four elements of each of the initial key values only, is transmitted to the decoding apparatus. In the prior art, 2-bit additional information about all key values is transmitted to the decoding apparatus. Therefore, the prior art syntax shown in FIG. 7a can be changed to an improved syntax according to the present invention shown in FIG. 7b. Accordingly, when N key value data are actually encoded, 2(N−1) less bits are generated in the present invention than in the prior art due to additional information being transmitted in the prior art.

Referring to FIG. 5 again, after step 510 key and key value data which are ADPCM processed are quantized in step 520. In order to remove bit redundancy in quantized values, quantized key and key value data are arithmetically encoded and output as binary format stream data in step 530.

An important factor in effectively reducing the amount of data to be actually encoded is removal of bit redundancy. That is, quantized bits have redundancy and known methods for removing this redundancy include a Variable Length Coding (VLC) method, and a Huffman coding method using a symbol pattern. In the present invention, an arithmetic coding method, in which bit redundancy is removed by calculating the frequency of symbol generation by using conditional probabilities, is used. The entropy encoding unit 225 of FIG. 2 performs this method and the binary field data output unit 230 for outputting compressed binary field data outputs encoded data as binary format stream data.

Here, determination of the structure of stream data with respect to types and functions of streaming services is considered in this streaming step. FIGS. 6a and 6b show two types of stream data structures. FIG. 6a shows a data structure which is provided when the real-time characteristic of services is not considered and has the simplest shape. In this structure, delay occurs for the same time period as the time period in which key data is restored. Compared to the structure of FIG. 6b, the structure of FIG. 6a has a higher processing cost of the encoding apparatus and a lower processing cost of the decoding apparatus. The structure of FIG. 6b provides the real-time characteristic and additional functionality of data services. In this structure, immediately after a key and corresponding key values are restored, visualization is enabled. Also, one additional function is error resistance. That is, though current data has a loss, the loss can be restored to some degree with previous data and next data to be restored. To provide data structures shown in FIGS. 6a and 6b, data to be encoded is encoded in order of 200→205→215→210→220→225 of FIG. 2. In step 225, arithmetic encoding is performed on keys and key values. According to the data structure of FIGS. 6a and 6b, the order of keys and key values to be encoded is different.

Referring to FIG. 5 again, after step 530, the encoded output data is restored in the inverse of the encoding process described above. With respect to the restoration result, visual distortion for evaluating the performance of the encoding apparatus is measured in step 540. When encoded output data is restored, the distortion measuring unit 265 measures visual quality distortion with respect to a rotation differential value, comparing with the original information before encoding. For this, the decoding unit is formed as 235 through 260 of FIG. 2 and the process performed in the decoding unit is the inverse of the encoding process.

The performance of the encoding apparatus is measured by a characteristic value, that is, visual quality distortion with respect to a decrease in data amount. In the prior art encoding methods, to measure the performance of an encoding apparatus, a characteristic value is used, for example, using equation 1. However, in this method a quantization error for each element for rotation is calculated, so the characteristics of a quaternion space cannot be shown and visual distortion degree of a real rotation movement cannot be expressed objectively. Therefore, the encoding apparatus according to the present invention additionally includes an improved distortion measuring unit 265 which satisfies the characteristics of a quaternion space and is capable of objectively measuring visual distortion with respect to quantization. The distortion measuring unit 265 measures quantization errors, regarding all points on the surface of an object as all points on a unit spherical surface. The basic principle of the measuring will now be explained.

A quantization error is defined as a difference value of two rotation transformations. That is, assuming that ($\vec{r}$, θ) denotes key values of an orientation interpolator node and ($\vec{r}$, θ') denotes key values obtained by restoring the key values through the decoding unit ($\vec{r}$ denotes a rotation axis, θ denotes a rotation angle, and the rotation angle satisfies θ∈[−π, π]), $\vec{x}$ is an arbitrary position vector on a unit spherical surface and satisfies S={$\vec{x}$ ∥$\vec{x}$∥=1}. When a rotation transformation from $\vec{x}$ to $\vec{y}$ and $\vec{y}'$ by ($\vec{r}$, θ) and ($\vec{r}'$, θ') is performed, a quantization error occurring is calculated as the difference between $\vec{y}$ and $\vec{y}'$. A quantization error vector $\vec{e}(\vec{x})$ satisfies $\vec{r}(\vec{x}) = \vec{y} - \vec{y}'$. When quantization error vectors $\vec{e}(\vec{x})$ of all points on a unit spherical surface are calculated using this equation, RMS($D_m$) for all the spherical surface and a maximum error ($D_p$) are calculated by the following equations 10:

$$\begin{cases} D_m \equiv \sqrt{E_{\vec{x} \in S}\left[\|\vec{e}(\vec{x})\|^2\right]} \\ D_p \equiv \max_{\vec{x} \in S} \sqrt{\|\vec{e}(\vec{x})\|^2} \end{cases} \quad (10)$$

Meanwhile, the relation between $\vec{y}$ and $\vec{y}'$ can be expressed in a rotation transformation equation as the following equation 11:

$$\vec{y}' = T_{\vec{r}^k, \theta^w}(\vec{y}) \quad (11)$$

A quantization error vector derived from these equations is defined as the following equations 12:

$$\|\vec{e}(\vec{x})\| = 2\cos\varphi \sin\frac{\theta''}{2} \quad (12)$$

where $\vec{x} = (1, \phi, \varphi)$, $\phi$ = azimuth angle, $\phi \in [-\pi, \pi]$, $\varphi$ = longitude angle, $\varphi \in [-\frac{\pi}{2}, \frac{\pi}{2}]$ RMS($D_m$) and a maximum error ($D_p$) which are newly derived according to equations 10 and 12 are defined as the following equation 13:

$$D_m = \sqrt{\frac{1}{4\pi} \int_S \|\vec{e}(\vec{x})\|^2 ds} = \sqrt{\frac{1}{4\pi} \int_{\varphi=-\frac{\pi}{2}}^{\varphi=\frac{\pi}{2}} \int_{\varphi=-\pi}^{\varphi=\pi} \left(2\cos\varphi\sin\frac{|\theta''|}{2}\right)^2 \cos\varphi d\varphi d\varphi}$$

$$= \sqrt{\frac{1}{4\pi} 8\pi\sin^2\frac{|\theta''|}{2} \int_{\varphi=-\frac{\pi}{2}}^{\varphi=\frac{\pi}{2}} \cos^3\varphi d\varphi}$$

$$= \sqrt{2\sin^2\frac{|\theta''|}{2} \int_{\varphi=-\frac{\pi}{2}}^{\varphi=\frac{\pi}{2}} \cos^3\varphi d\varphi} = \sqrt{2}\sin^2\frac{|\theta''|}{2} \sqrt{\int_{\varphi=-\frac{\pi}{2}}^{\varphi=\frac{\pi}{2}} \cos^3\varphi d\varphi}$$

$$= \sqrt{2} \sin^2\frac{|\theta''|}{2} \sqrt{\left(\left[\frac{2+\cos^2\varphi}{3}\sin\varphi\right]\right)_{\varphi=-\frac{\pi}{2}}^{\varphi=\frac{\pi}{2}}}$$

$$= \sqrt{2}\sin\frac{|\theta''|}{2}\sqrt{\frac{2}{3} - \frac{2}{3}(-1)} = \sqrt{2}\sin\frac{|\theta''|}{2}\sqrt{\frac{4}{3}} = \sqrt{\frac{8}{3}}\sin\frac{|\theta''|}{2}$$

$$\begin{cases} D_m = \sqrt{\frac{8}{3}} \sin\frac{|\theta''|}{2} \left(cf \cdot \text{mean error} = \frac{\pi}{2}\sin\frac{|\theta''|}{2}\right) \\ D_p = 2\sin\frac{|\theta''|}{2} \end{cases}$$

(13)

Meanwhile, $\vec{x}$, $\vec{y}$, and $\vec{y}'$ are defined in a quaternion space as:

$$\begin{cases} X = (0, \vec{x}) \\ Y = (0, \vec{y}) \\ Y' = (0, \vec{y}') \end{cases}$$

If $(\vec{r}, \theta)$ and $(\vec{r}, \theta')$ which represent a rotation transformation are expressed in a quaternion space and referred to as Q and Q', respectively, equations, Y=Q*X*Q* and X=Q**Y*Q, can be derived. Here, A*B indicates quaternion multiplication and A* denotes A's conjugate. From these equations, the following equation is derived:

$$Y' = Q'^* X^* Q'^* = Q'^* Q^{**} Y^* Q^* Q'^* = Q''^* Y^* Q''^*$$

Q'' denotes the rotation transformation operation between $\vec{y}$ and $\vec{y}'$, and is defined as the following equation 14:

$$Q'' = Q'^* Q^* \quad (14)$$

Therefore, using equations 13 and 14, RMS($D_m$) of a quantization error for all unit spherical surface and the maximum error ($D_p$) are defined as the following equations 15 or equations 16:

$$\theta'' = 2\cos^{-1} q_0'' = 2\cos^{-1}(Q' \cdot Q), \theta'' \in [0, \pi], q_0'' = Q' \cdot Q,$$

($\cdot$ indicates inner product operation)

$$\begin{cases} D_m = \sqrt{\frac{8}{3}} \sin\frac{|\theta''|}{2} = \sqrt{\frac{8}{3}} \sin\{|\cos^{-1}(Q' \cdot Q)|\} \\ D_p = 2\sin\frac{|\theta''|}{2} = 2\sin\{|\cos^{-1}(Q' \cdot Q)|\} \end{cases} \quad (15)$$

$$\begin{cases} D_m = \sqrt{\frac{8\{1-(Q' \cdot Q)^2\}}{3}} \\ D_p = \sqrt{4\{1-(Q' \cdot Q)^2\}} \end{cases} \quad (16)$$

Equations 15 and 16 reflect physical characteristics of rotational and translational movement of an object in a quaternion space and therefore are more accurate than equation 1. Therefore, in the present invention, the distortion measuring unit 265 is formed so as to use equations 15 or 16. Accordingly, the present invention is characterized in that it can measure visual distortion degree due to quantization error more objectively and accurately than the prior art methods.

Figure 8:
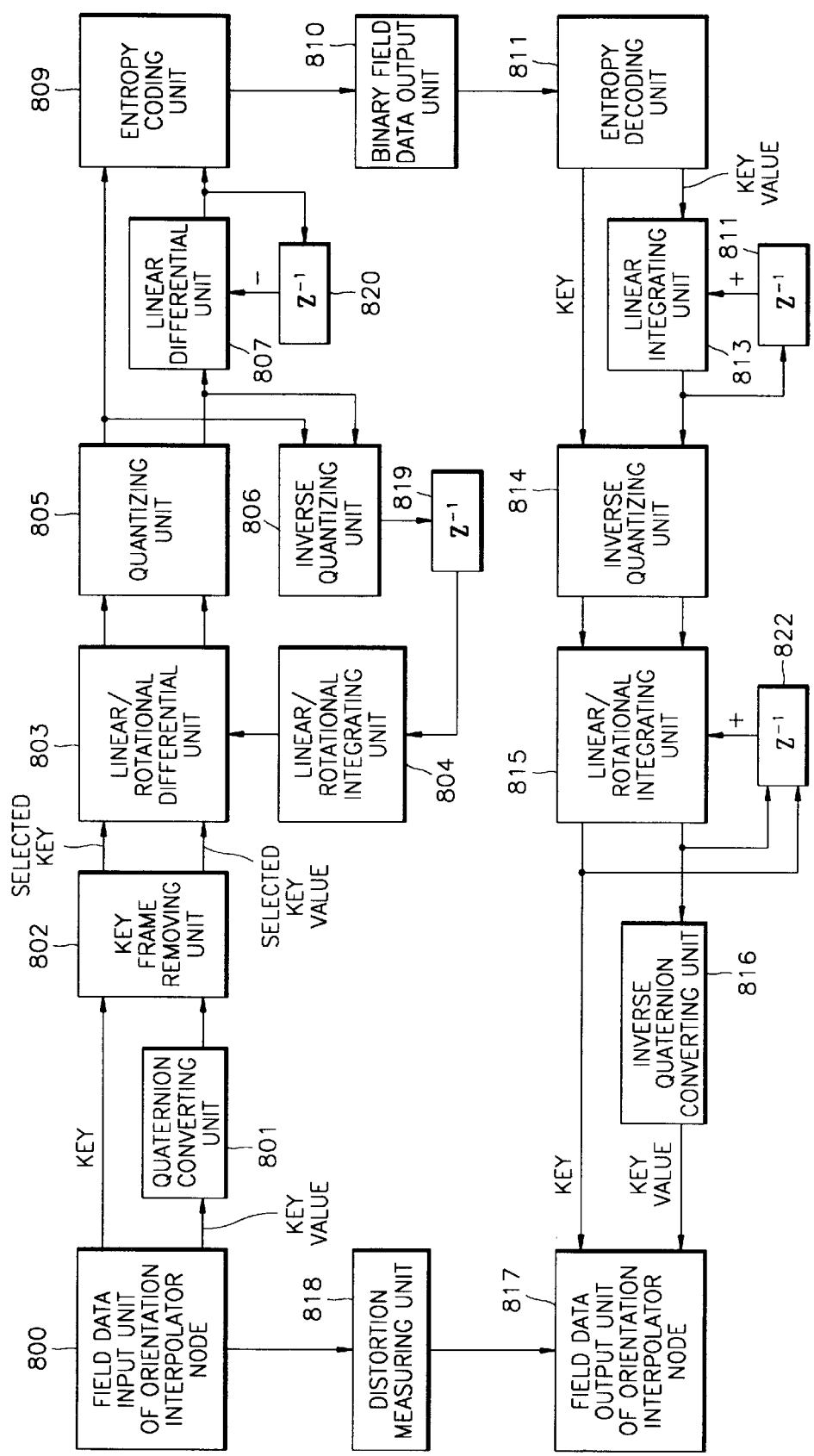

FIG. 8 is a schematic block diagram of an encoding apparatus for an orientation interpolator node according to a second preferred embodiment of the present invention.

Referring to FIG. 8, the encoding apparatus basically includes a field data input unit of an orientation interpolator node 800, a field data processing unit, a quantizing unit 805, a linear differential unit 807, and a compressed binary field data output unit 810, and additionally includes an entropy encoding unit 809. The field data processing unit includes a quaternion converting unit 801, a key frame removing unit 802, and a linear/rotational differential unit 803, and additionally includes an inverse quantizing unit 806, a delay unit 819, and a linear/rotational integrating unit 804.

The quaternion converting unit 801 converts key values to quaternion values. Using similarity in rotation transformation with respect to continuous time changes, the key frame removing unit 802 removes key frames and keys, respectively, from quaternion values from the quaternion converting unit 801 and keys from the field data input unit of an orientation interpolator node 800, within an allowable error limit, and then outputs selected key frames and keys. The linear/rotational differential unit 803 receives the selected key frames and keys and obtains rotational differentials between difference values among keys and quaternion values. The quantizing unit 805 quantizes the values converted by the linear/rotational differential unit 803. The linear/rotational differential unit 807 obtains linear differentials of quantized quaternion values. The entropy encoding unit 809 removes bit redundancy. Meanwhile, the encoding apparatus further includes the inverse quantizing unit 806 for receiving the output from the quantizing unit 805 and inverse quantizing the output, the delay unit 819 for delaying the output of the inverse quantizing unit 806, and the linear/rotational integrating unit 804 for rotation-integrating (or accumulating) the output of the delay unit 819 and feeding the result to the linear/rotational differential unit 803.

Also, in order to confirm the restored result of output data on the screen and to measure the degree of visual due to a quantization error, the encoding apparatus additionally includes a decoding unit for inversely performing the encoding process of the field data processing unit minus the function of the key frame removing unit 802. The decoding unit includes an entropy decoding unit 811, a linear integrating unit 813, a delay unit 821, an inverse quantizing unit 814, a linear/rotational integrating unit 815, a delay unit 822, a quaternion converting unit 816, a field data output unit of an orientation interpolator node 817, and a distortion measuring unit 818.

The distortion measuring unit 818 measures visual picture quality distortion degree with respect to a decrease in data amount. According to the preferred embodiment of the present invention, the distortion measuring unit 818 more objectively and accurately measures visual picture quality distortion degree due to quantization, reflecting the characteristics of rotation transformation. The basic principle of the measuring will now be explained. A quantization error is defined as a differential rotation angle in a differential rotation transformation of the original rotation transformation and restored rotation transformation. That is, assuming that $(\vec{r}, \theta)$ denotes a key value of an orientation interpolator node and $(\vec{r}, \theta')$ denotes a key value obtained by restoring the key value through the decoding unit ($\vec{r}$ denotes a rotation axis, $\theta$ denotes a rotation angle, and the rotation angle satisfies $\theta \in [-\pi, \pi]$), when a rotation transformation from an arbitrary position $\vec{x}$ to $\vec{y}$ and $\vec{y}'$ on a 3-dimensional space by $(\vec{r}, \theta)$ and $(\vec{r}', \theta')$ is performed, a quantization error $\vec{e}(\vec{x})$ occurring is calculated as the difference between $\vec{y}$ and $\vec{y}'$, i.e., $\vec{e}(\vec{x}) = \vec{y} - \vec{y}'$. In quaternion expression, $\vec{x}$, $\vec{y}$, and $\vec{y}'$ are defined as the following equations 17:

$$\begin{cases} X = (0, \vec{x}) \\ Y = (0, \vec{y}) \\ Y' = (0, \vec{y}') \end{cases} \quad (17)$$

If $(\vec{r}, \theta)$ and $(\vec{r}', \theta')$ which represent a rotation transformation are expressed in a quaternion space and referred to as Q and Q', respectively, the following equations 18 are derived:

$$Y = Q*X*Q^*$$
$$X = Q^{**}Y*Q \quad (18)$$

Here, A*B indicates quaternion multiplication and A* denotes A's conjugate. Therefore, the following equation 19 is derived:

$$Y' = Q'*X*Q'^* = Q'*Q^{**}Y*Q*Q'^* = Q''*Y*Q''^* \quad (19)$$

Here, Q" denotes the rotation transformation information between $\vec{y}$ and $\vec{y}'$, and is defined as the following equation 20:

$$Q'' = Q'*Q^* \quad (20)$$

Therefore, if $\theta''$ denotes a differential rotation angle between $\vec{y}$ and $\vec{y}'$, $\theta''$ can be obtained using the quaternion converting equation and equation 20 as follows:

$$\theta'' = 2\cos^{-1} q_0'' = 2\cos^{-1}(Q' \cdot Q), \theta'' \in [0, \pi], q_0'' = Q' \cdot Q, \quad (21)$$

(·indicates inner product operation)

Equation 21 indicates an instantaneous quantization error occurring in a predetermined time among all animation key frames. In order to derive an equation for obtaining a quantization error of all animation intervals, equation 21 can be expressed by an instantaneous quantization error at a predetermined time t as the following equation 22:

$$e(t) = 2\arccos\{Q(t) \cdot Q'(t)\} \quad (22)$$

If equation 22 is applied to all key frame intervals performing animation through the orientation interpolating method, the average error $E_m$ and the maximum error $E_p$ for all intervals $[t_0, t_L]$ can be derived as the following equations 23:

$$\begin{cases} E_m = \sqrt{\dfrac{1}{t_L - t_0} \int_0^L e^2(t) dt} \\ E_p = \max_{t_0 \le t \le t_L} |e(t)| \end{cases} \quad (23)$$

Here, partial sum $E_m^i$ is first obtained from interval $[t_{i-1}, t_i]$ in order to obtain $E_m$ as the following equation 24:

$$E_m^i = \int_{t_{i-1}}^{t_i} e^2(t) dt = 4 \int_{t_{i-1}}^{t_i} \arccos^2[Q(t) \cdot Q'(t)] dt \quad (24)$$

Meanwhile, because $4\arccos^2 Q(t) \cdot Q'(t) = \phi^2(\alpha)$, $t = t_{i-1} + \alpha(t_i - t_{i-1})$, the following equation 25 is derived:

$$E_m^i = (t_i - t_{i-1}) \int_0^1 \phi^2(\alpha) d\alpha \quad (25)$$

Because it is difficult to obtain the definite integral of function $\phi^2(\alpha)$ in integral interval $[0, 1]$, approximation is performed as the following equations 26 and 27:

$$\phi(\alpha) \cong \phi(0) + \alpha\{\phi(1) - \phi(0)\} \quad (26)$$

$$\phi^2(\alpha) \cong \phi^2(0) + \alpha^2\{\phi(1) - \phi(0)\}^2 + 2\alpha\phi\{\phi(1) - \phi(0)\} \quad (27)$$

Here, $$\cos\frac{\phi(0)}{2} = Q(t_{i-1}) \cdot Q'(t_{i-1}), \text{ and } \cos\frac{\phi(1)}{2} = Q(t_i) \cdot Q'(t_i).$$

Using the approximated function, a partial sum $E_m^i$ can be obtained as the following equation 28:

$$E_m^i \cong \frac{1}{3}(t_i - t_{i-1})\{\phi^2(0) + \phi^2(1) + \phi(0)\phi(1)\} \quad (28)$$

Equation 28 can be rearranged as the following equation 29:

$$E_m^i \cong \frac{4}{3}(t_i - t_{i-1})[\arccos^2(Q(t_{i-1}) \cdot Q'(t_{i-1})) + \arccos^2 \quad (29)$$

$$(Q(t_i) \cdot Q'(t_i))\arccos(Q(t_{i-1}) \cdot Q'(t_{i-1}))\arccos(Q(t_i) \cdot Q'(t_i))]$$

Also, the partial sum $E_m^i$ is added to all intervals $[t_0, t_L]$ and then the average error $E_m$ is obtained as the following equation 30:

$$E_m \cong \sqrt{\frac{1}{t_L - t_0} \sum_{i=1}^{L} E'_m} \quad (30)$$

To obtain the maximum error $E_p$, a maximum value is selected among maximum errors $E_p^i$ in each interval $[t_{i-1}, t_i]$, according to the following equation 31:

$$E_p^i \cong \max_{t_{i-1} \leq t \leq t_i} |e(t)| = \max_{t_{i-1} \leq t \leq t_i} 2 |\arccos\{Q(t) \cdot Q'(t)\}| \quad (31)$$

Using the approximation function described above, $E_p^i$ can be approximated as the following equation 32:

$$E_p^i \cong \max\{\phi(0), \phi(1)\} = \max\{2|\arccos(Q(t_{i-1}) \cdot Q'(t_{i-1}))|, 2|\arccos(Q(t_i) \cdot Q'(t_i))|\} \quad (32)$$

The maximum error $E_p$ in all intervals $[t_0, t_L]$ is expressed as the following equation 33:

$$E_p \cong \max_{i=1,\ldots,L} E_p^i \quad (33)$$

Therefore, the distortion measuring unit 818 measures distortion based on equations 32 and 33, so it can more objectively and accurately measure visual distortion degree due to a quantization error in a quaternion space.

The key frame removing unit 802 removes key frames within an allowable error limit, using similarity in rotation transformation with respect to continuous time changes. This method for removing key frames is one of a group of loss encoding methods. In the loss encoding of key frame animation, the prior art MPEG-4 BIFS uses a method in which low-bit quantization is performed uniformly for key values of all key frames. However, the method cannot reflect how much each key frame is responsible for degradation of visual picture quality. Accordingly, low bit quantization results in great degradation in picture quality. The key frame removing unit 802 performs relatively high bit quantization for each key frame, while removes key frames in order of less influence on degradation of visual picture quality. Therefore, the key frame removing unit 802 generates an amount of data similar to that of the prior art while maintains far better picture quality.

Referring to FIGS. 14 through 19, the process for removing key frames in the key frame removing unit 802 will now be explained in detail.

Figure 14:
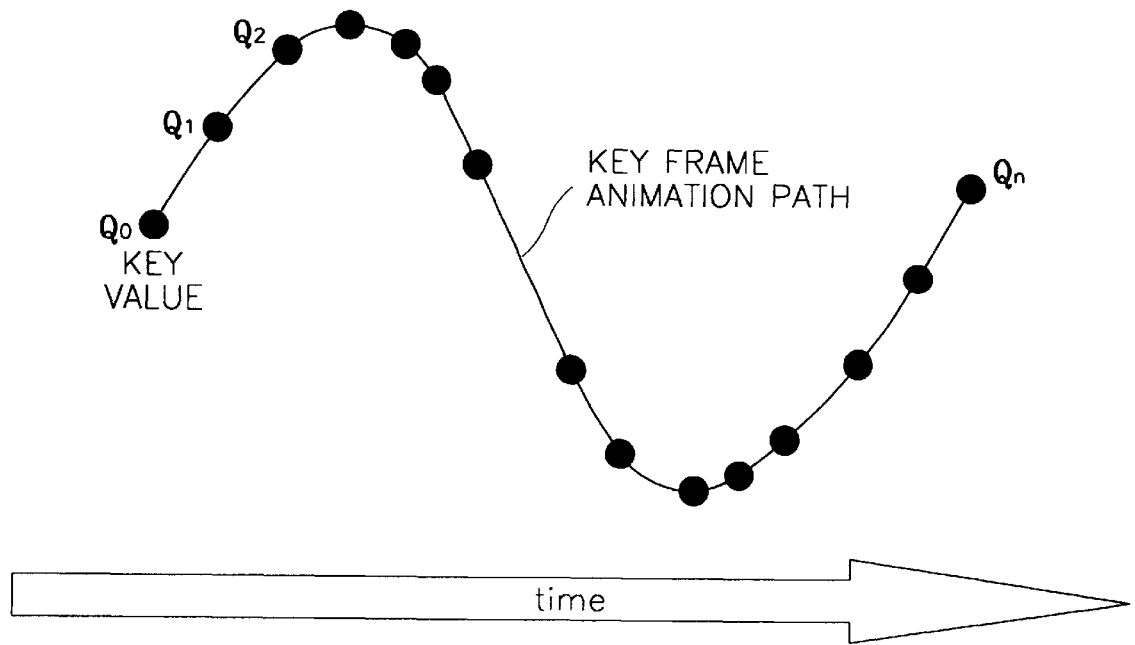

Step 1: Referring to FIG. 14, a black point indicates key values ($=Q_0, Q_1, Q_2, \ldots, Q_n$) of each key frame with respect to n+1 time points on the original animation path.

Figure 15:
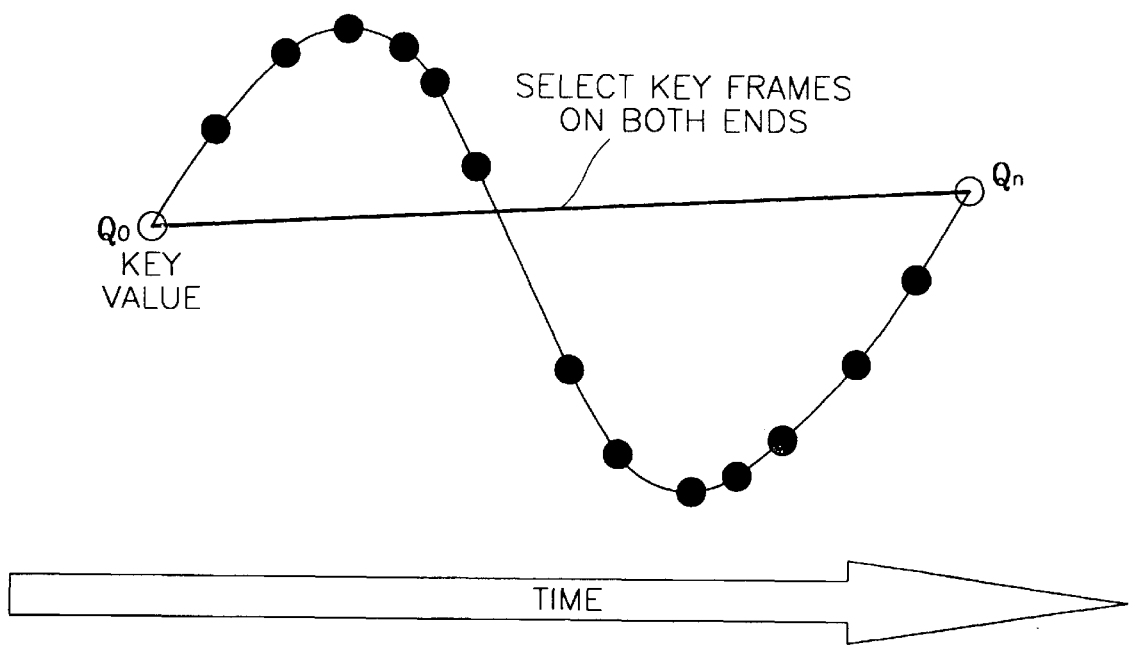

Step 2: As shown in FIG. 15, two key frames ($=Q_0, Q_n$) corresponding to two ends of the animation path among key frames on the animation path are first selected. The selected points are shown as white points.

Figure 16:
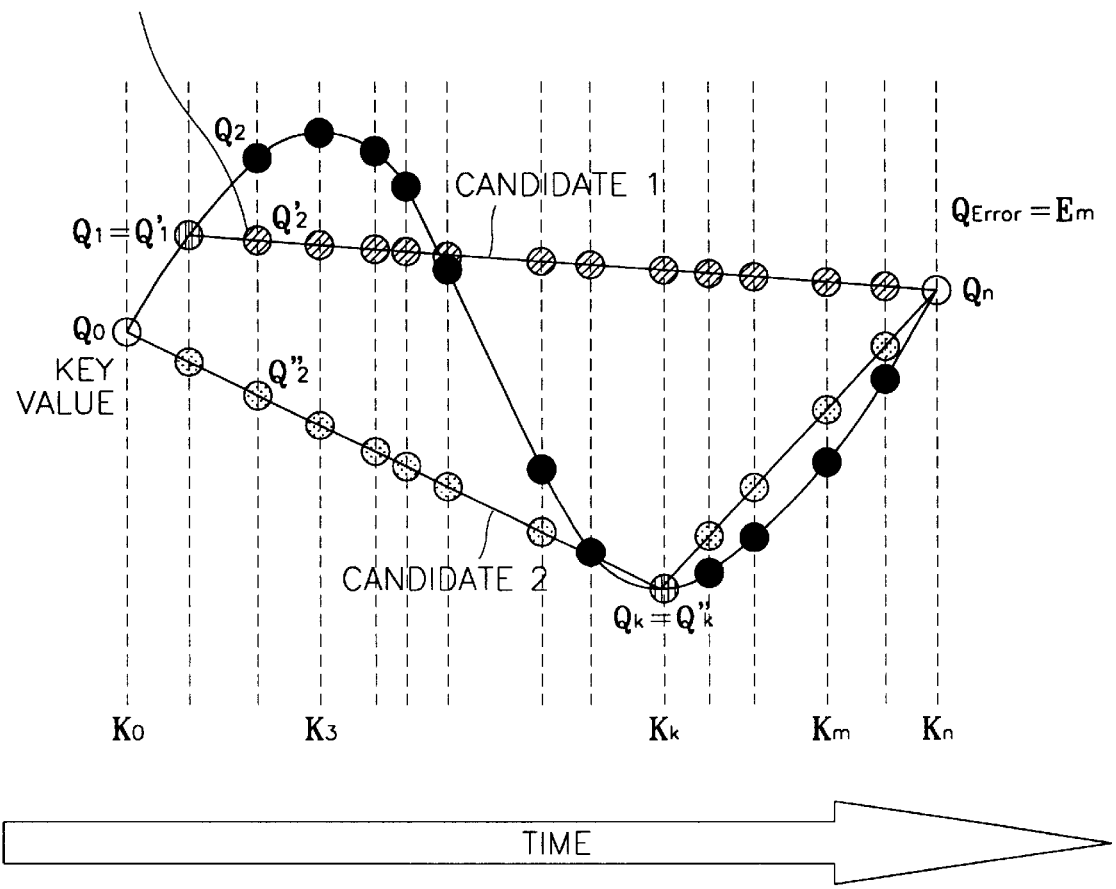

Step 3: As shown in FIG. 16, one key frame among key frames except the selected two end key frame is selected. At this time, the number of methods for selecting one key frames is (n−1). FIG. 16 shows an example in which two candidates are selected and marked by oblique lines. Next, using total three selected key frames ($Q_0, Q_1$, and $Q_n$, or $Q_0, Q_k$, and $Q_n$), spherical linear interpolation is performed for (n−1) candidates which are not selected.

Step 4: By comparing the original animation path and the interpolated (n−1) paths, an animation path which has the least path error is selected and a new key frame from the selected animation path is selected. The error between paths is obtained by using the average error $E_m$ described above.

Figure 17:
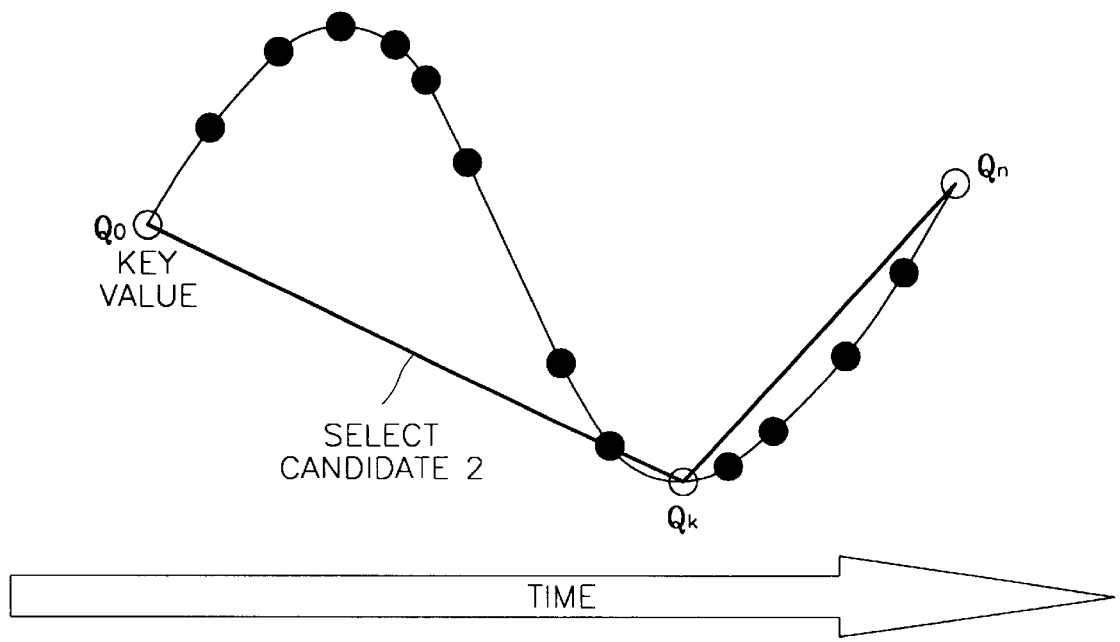

Step 5: FIG. 17 shows an example in which the path of candidate 2 is selected.

Figure 18:
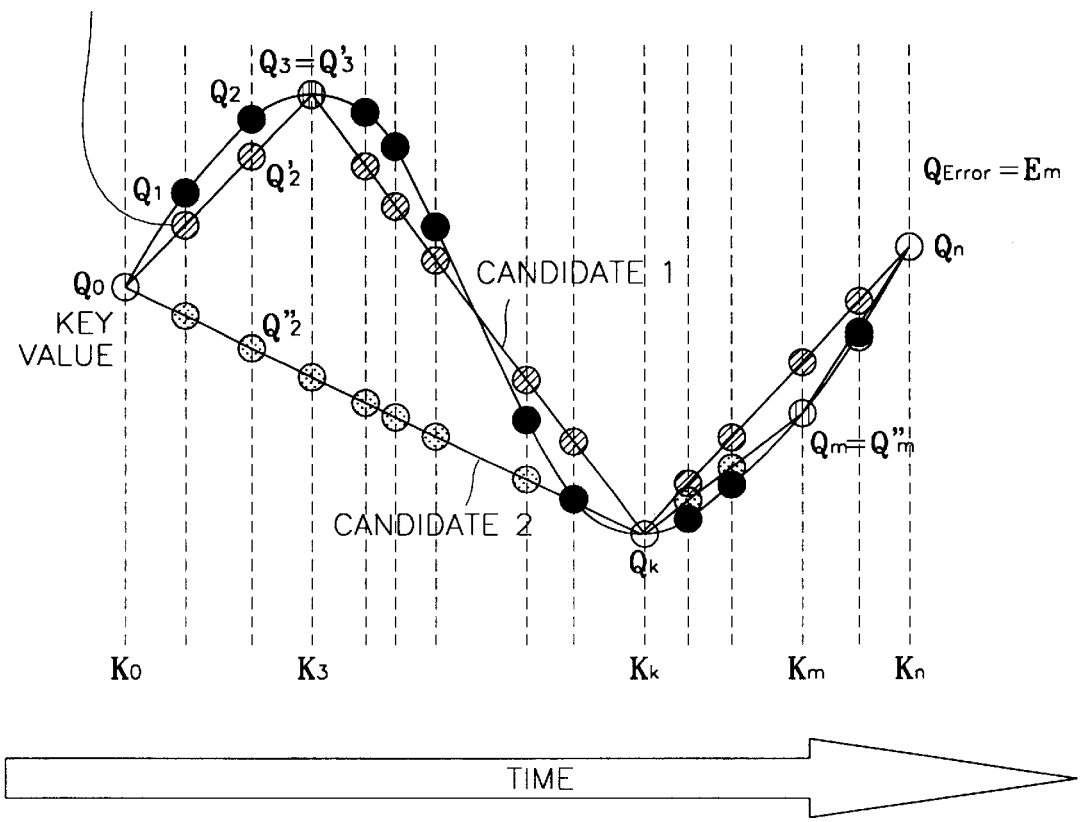

Step 6: As shown in FIG. 18, one key frame among key frames except the three selected key frames is selected. Then, steps 3 and 4 are performed.

Figure 19:
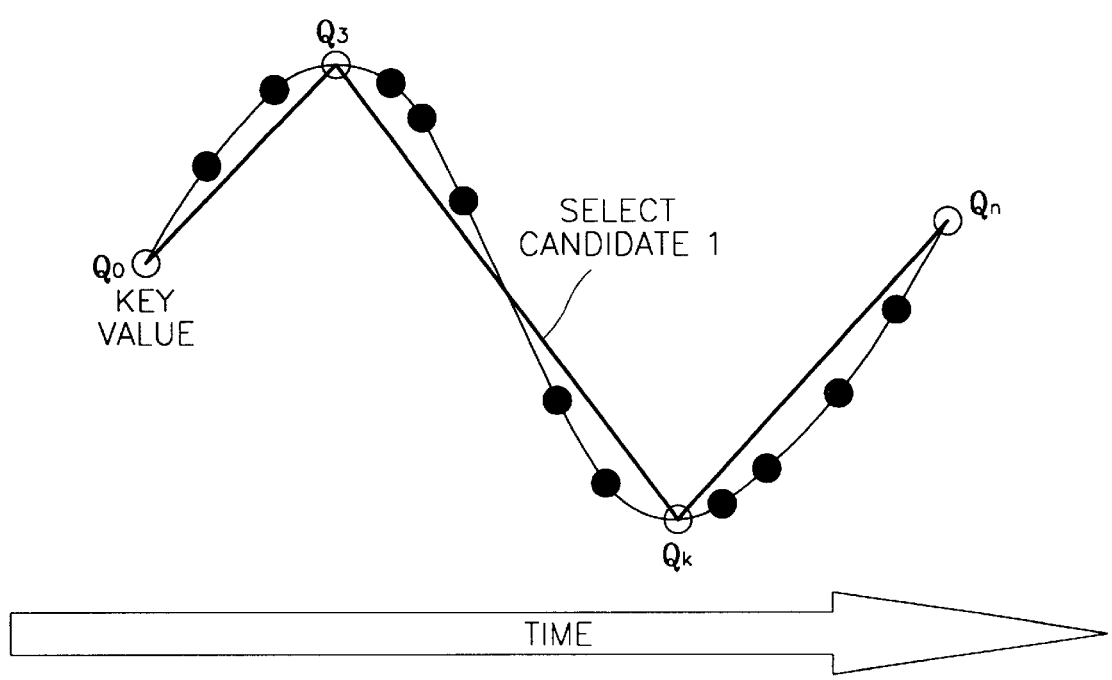

Step 7: FIG. 19 shows an example in which the path of candidate 1 is selected.

Step 8: Steps 6 and 7 are repeatedly performed until the average error becomes less than an allowable error.

The linear/rotational differential unit 803 obtains rotational differentials between key values corresponding to continuous keys on the quaternion space, using the rotational differential equation.

In the prior art linear differential method, a linear differential between a rotation transformation quaternion $Q_1$ of an object corresponding to a current key and a rotation transformation quaternion $Q_2$ of the object corresponding to the next key is calculated by the following equations 34:

$$Q_1 = (q_{01}, q_{11}, q_{21}, q_{31}), Q_2 = (q_{02}, q_{12}, q_{22}, q_{32})$$

$$Q_{DPCM} = (q_{01} - q_{02}, q_{11} - q_{12}, q_{21} - q_{22}, q_{31} - q_{32}) \quad (34)$$

Thus, the method which considers only difference values between quaternion components cannot show rotation differential values which take into account actual rotation transformation, so the method results in a decrease in redundancy of data to be encoded. Also, in order to reduce the number of bits to be encoded, only three components except a component having the largest value among four quaternion components are encoded. From the aspect of data restoration, in this prior art linear differential method, 2-bit long information should be additionally transmitted from the encoding apparatus to the decoding apparatus in order to indicate a component having the largest value in each key value.

Therefore, in encoding data by using rotation transformation differentials between key values of an orientation interpolator node, the linear/rotational differential unit 803 in the preferred embodiment of the present invention adopts a linear/rotational differential method different from the prior art method. The adopted method will now be explained in detail.

Assuming that $\vec{x}$ denotes the current position vector of an object, ($\vec{n}_{i-1}, \theta_{i-1}$) denotes key values (key_value) when a key satisfies key=$k_{i-1}$, and $\vec{y}_{i-1}$ denotes a displacement vector of $\vec{x}$ after a rotational and translational movement of the object, a rotational and translational movement equation in a quaternion space is expressed as the following equation 35:

$$Y_{i-1} = Q_{i-1} * X * Q^*_{i-1} \quad (35)$$

Here, X, $Y_{i-1}$, and $Q_{i-1}$ are quaternion expressions of $\vec{x}$, ($\vec{n}_{i-1}, \theta_{i-1}$) and $\vec{y}_{i-1}$, respectively. In the same manner, when key=$k_i$, the rotational and translational movement equation in a quaternion space is expressed as the following equation 36:

$$Y_i = Q_i * X * Q^*_i \quad (36)$$

Meanwhile, from equation $$q = \left(\cos\frac{\theta}{2}, \frac{n_x}{\|n\|}\sin\frac{\theta}{2}, \frac{n_y}{\|n\|}\sin\frac{\theta}{2}, \frac{n_z}{\|n\|}\sin\frac{\theta}{2}\right)$$

and equation Q"32 Q'*Q*, an equation for obtaining a rotation differential value is derived as the following equation 37:

$$Y_{i=Qi}*X*Q*_i = Q_i*Q*_{i-1}Y_{i-1}*Q_{i-1}*Q*_{i-1} = Q'_i*Y_{i-1}*Q'*_i \quad (37)$$

Therefore, a quaternion converting rotation differential matrix equation representing a rotation differential is defined as the following equation 38:

$$Q'_i = Q_i*Q*_{i-1} \quad (38)$$

In the present embodiment, in order to reduce the number of bits to be encoded, only three components, excluding the first component, of four components forming a rotation differential value are encoded. Therefore, using the three components, the decoding unit restores the remaining one component. The decoding method will now be explained in detail. All rotation differential values are represented by unit quaternion expression values. Therefore, the norm of a quaternion representing a rotation differential is always 1. Based on this, the remaining one component is restored using the following equation 39:

$$\hat{q}_0 = \sqrt{1 - (\hat{q}_1^2 + \hat{q}_2^2 + \hat{q}_3^2)} \quad (39)$$

In equation 39, $\hat{q}_1$, $\hat{q}_2$, and $\hat{q}_3$ are the three components of restored rotation differential values, respectively, and $\hat{q}_0$ is the first component restored using the three components. In this case, the sum of squares of the three components of the restored rotation differential value may exceed 1 due to a quantization error. At this time, the value of $\hat{q}_0$ cannot be determined using equation 39. This means that $\hat{q}_0$ is a value very close to 0 and is less than a minimum unit which can be quantized by the quantizing unit 805. Physically, this means an about 180 degree angle rotation transformation. Therefore, the decoding unit should have a method for determining the value of $\hat{q}_0$ in this case. In addition, the influence of the determined value of $\hat{q}_0$ on the other three components should be minimized. As an example, a minimum unit value of quantization or its proportional multiple value may be determined as the value of $\hat{q}_0$. A specific equation for obtaining the value is as the following equation 40:

$$\hat{q}_0 = \alpha \cdot 2^{-m} = \alpha \cdot \frac{1}{2^m} \quad (40)$$

Here, α denotes a constant of proportionality and m denotes the number of quantization bits. This method has a merit in that 2-bit additional information, which is given to each of all key values in the prior art linear differential method, does not need to be sent to the decoding apparatus. In addition, as shown in FIG. 13, the present embodiment can derive syntax (b) from syntax (a) of the prior art linear differential method. As a result, when actually encoding N key values, the present embodiment can reduce the amount of generated bits by 2N bits from the amount of generated bits in the prior art additional information.

Figure 11:
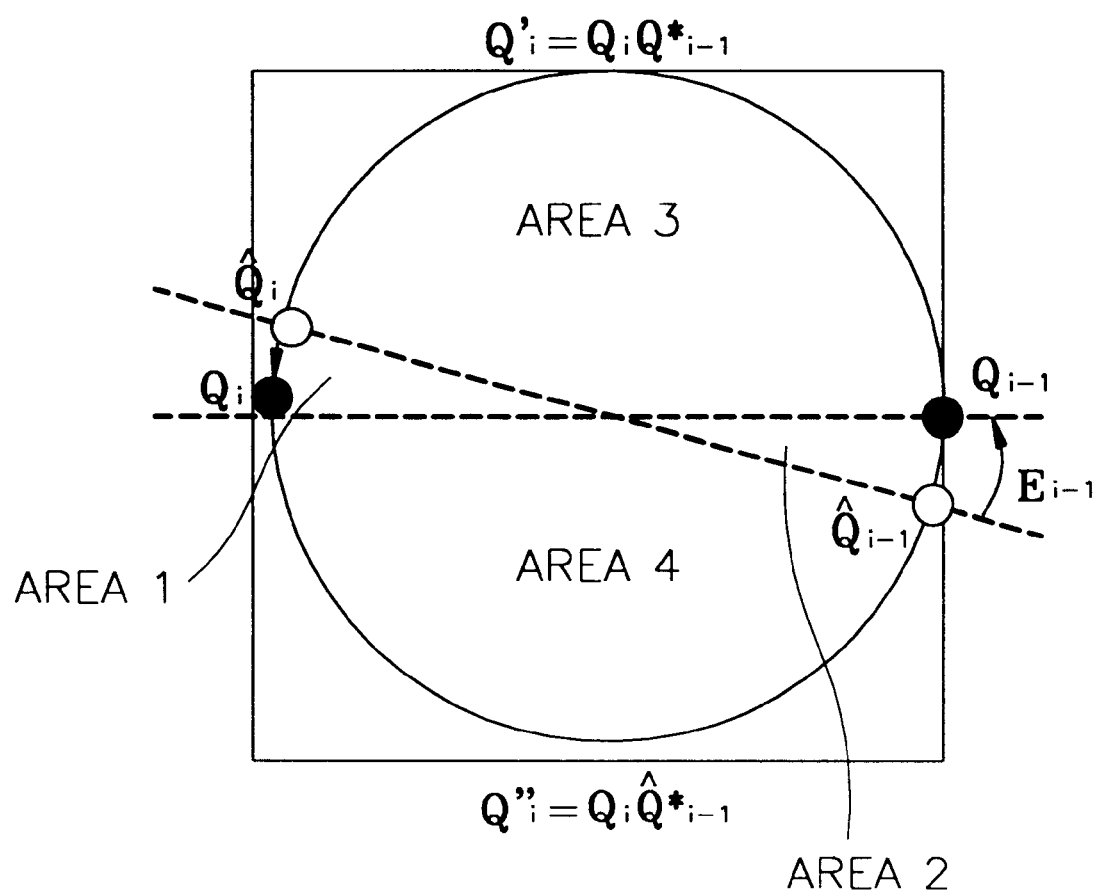

FIG. 11 is a reference diagram for explaining a rotation direction error in quaternion encoding using a rotation differential. The rotation direction error occurs because the quaternion encoding is a type of loss encoding.

Referring to FIG. 11, assuming that $Q_i$ denotes the position of the object based on rotation information which is input at present, and $Q_{i-1}$ denotes the previous position of the object, the relation of the two positions can be expressed by four different areas. That is, if the object rotates from the position $Q_{i-1}$ to $Q_i$ through the shortest arc and the relation of the two positions is in area 1 or area 3, the object rotates counterclockwise from $Q_{i-1}$ to $Q_i$. Also if the object rotates from the position $Q_{i-1}$ to $Q_i$ through the shortest arc and the relation of the two positions is in area 2 or area 4, the object rotates clockwise from $Q_{i-1}$ to $Q_i$.

If the object rotates according to rotation information which is encoded and then decoded, the decoding unit rotates the object using two values: decoding information $\hat{Q}_{i-1}$ corresponding to original rotation information $Q_{i-1}$, and $\hat{Q}_i$ corresponding to $Q_i$. Therefore, referring to FIG. 11 again, the position of $\hat{Q}_i$ against $\hat{Q}_{i-1}$ is in area 2 and area 3, the object rotates counterclockwise and if the position is in area 1 and area 4, the object rotates clockwise. Thus, rotating the object using the original rotation information and rotating the object using decoding rotation information cause opposite direction rotations in area 1 and area 2. This is because in quaternion encoding, loss encoding is performed and therefore $Q_i$ is not the same as $\hat{Q}_i$. This occurs inevitably in loss encoding. Because area 1 and area 2 are essential areas, an operation for minimizating inverse rotation or for making the rotation direction the same as the original direction is needed. In the present embodiment, the latter operation is adopted.

Briefly explaining a rotation direction correction function, referring to FIG. 11, areas 1 and 2 where a rotation direction error occurs are detected, the differential quaternion value to be encoded is compulsorily controlled so that the rotation direction is the same as the original rotation direction. Though the inconsistence of rotation directions also occurs in area 2, in area 2 unlike area 1, the original quaternion value and the restored quaternion value are convergent. Therefore, the rotation direction correction function is performed in area 2 and not in area 1.

Figure 9:
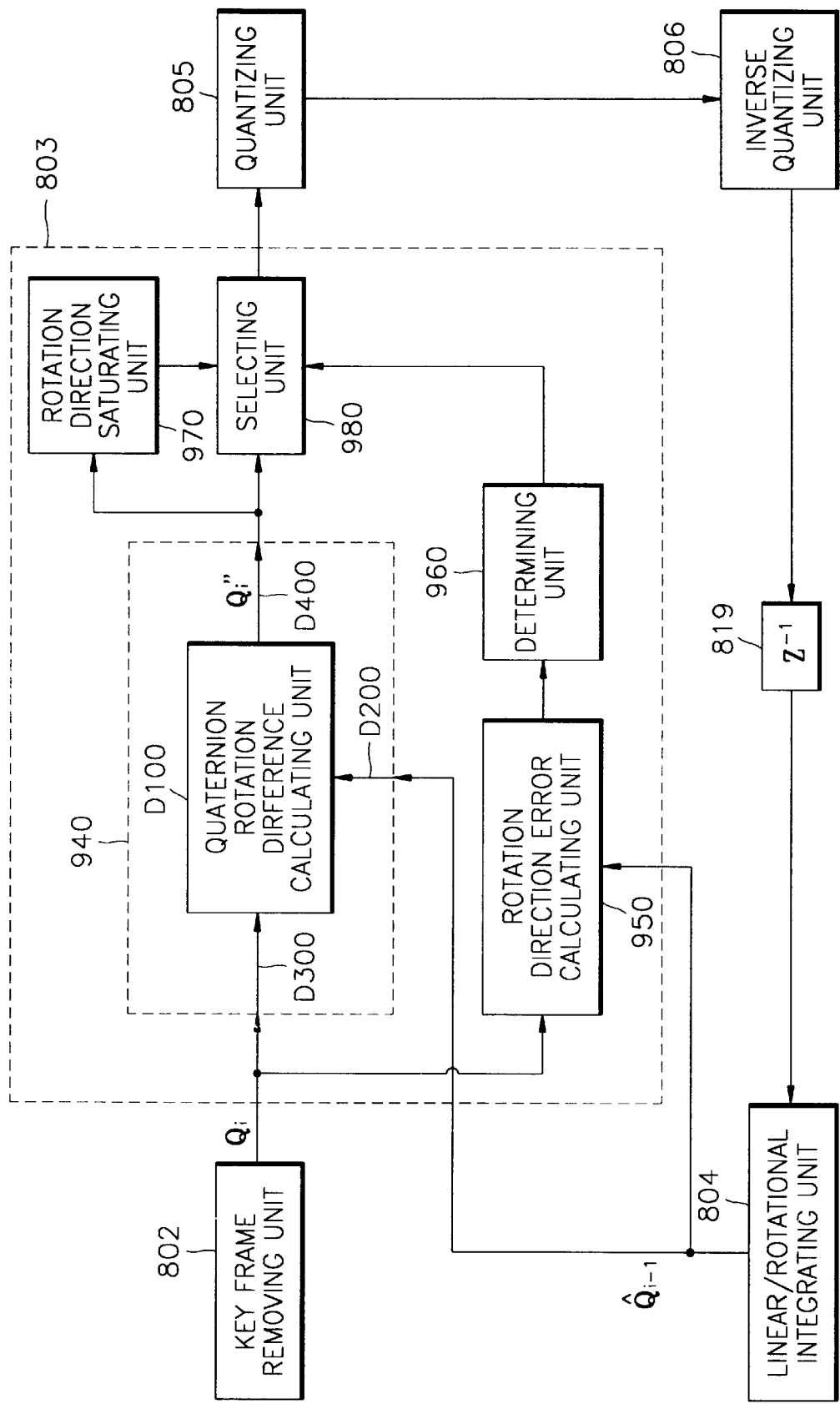
Figure 10:
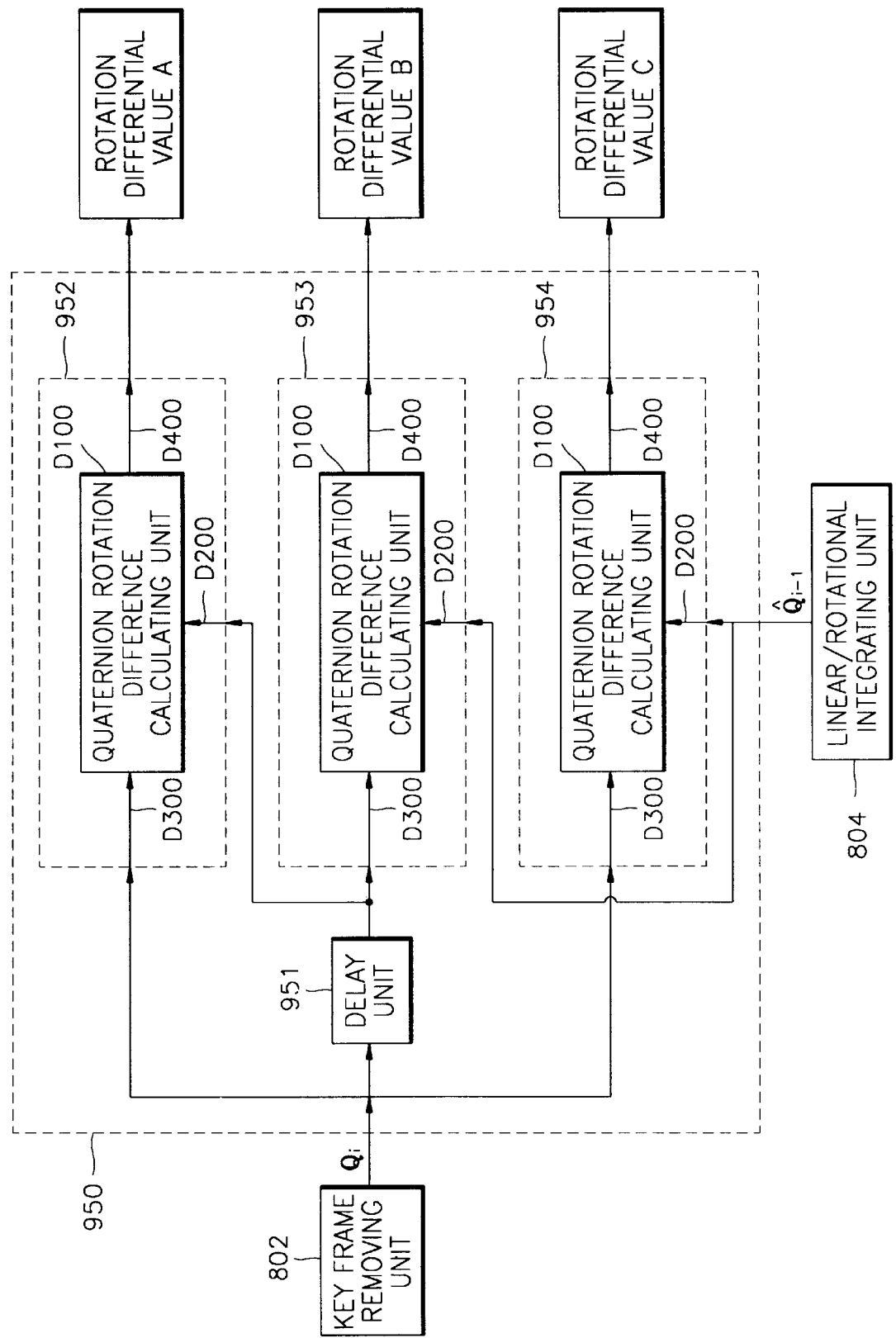

FIGS. 9 and 10 are block diagrams for explaining the rotation direction correction function of the encoding apparatus of FIG. 8.

Referring to FIG. 9, a rotation direction error calculating unit 950 and a determining unit 960 detect a case of area 1. As shown in FIG. 10, the rotation direction error calculating unit 950 includes quaternion rotation difference calculating units 952, 953, and 954 for calculating three differential rotation quaternion values. Three obtained rotation differential values A, B, and C are as follows:

Rotation differential value A: $Q_i(Q_{i-1})*$

Here, rotation differential value A indicates the rotation direction of the object in a time interval $[t_{i-1}, t_i]$ by the original rotation information.

Rotation differential value B: $Q_{i-1}(\hat{Q}_{i-1})*$

Here, rotation differential value B indicates the rotation position error and direction of the object due to an encoding error at time $t_{i-1}$.

Rotation differential value C: $Q_i(\hat{Q}_{i-1})*$

Here, rotation differential value C indicates the direction of differential quaternion information to be provided for encoding at time $t_i$.

The determining unit 960 determines area 1 explained in FIG. 11, using the three rotation differential values A, B, and C. If it is area 1, the determining unit 980 selects an input from a rotation direction saturating unit 970 for setting the rotation direction to a saturation value, so that the rotation direction is corrected to the original rotation direction. If it is not area 1, the determining unit 980 selects an input from the quaternion rotation difference calculating unit 940 so that the rotation direction correction function is not performed, and outputs the selected signal. The operation at this time is the same as the above-described case, in which a differential quaternion value is obtained and provided to the quantizing unit 805. The principle of the operation of the determining unit 960 will now be explained in detail. The determining unit 960 includes five logic determining units, and outputs the result of performing an AND operation on five logical value outputs. Five logical operations included in the determining unit 960 are as follows:

$$\text{Logical expression A:} \begin{pmatrix} q_{A,1} \\ q_{A,2} \\ q_{A,3} \end{pmatrix} \cdot \begin{pmatrix} q_{C,1} \\ q_{C,2} \\ q_{C,3} \end{pmatrix} < 0$$

Here, if rotation differential value A of FIG. 10 is $Q_A$, and $$Q_A = (q_{A,0}, q_{A,1}, q_{A,2}, q_{A,3})^T, \begin{pmatrix} q_{A,1} \\ q_{A,2} \\ q_{A,3} \end{pmatrix}$$

indicates a 3-dimensional vector $(q_{A,1}, q_{A,2}, q_{A,3})^T$ which is formed of three elements except the first element $q_{A,0}$ among the four elements.

Likewise, $$\begin{pmatrix} q_{C,1} \\ q_{C,2} \\ q_{C,3} \end{pmatrix}$$

indicates a 3-dimensional vector formed of three elements except the first element in rotation differential value C of FIG. 10.

$$\begin{pmatrix} q_{A,1} \\ q_{A,2} \\ q_{A,3} \end{pmatrix} \cdot \begin{pmatrix} q_{C,1} \\ q_{C,2} \\ q_{C,3} \end{pmatrix}$$

indicates the inner product of two 3-dimensional vectors. If the inner product is a negative number, logical value A is defined as 'true', and otherwise it is defined as 'false'.

$$\text{Logical expression B:} \begin{pmatrix} q_{B,1} \\ q_{B,2} \\ q_{B,3} \end{pmatrix} \cdot \begin{pmatrix} q_{C,1} \\ q_{C,2} \\ q_{C,3} \end{pmatrix} < 0$$

Here, $$\begin{pmatrix} q_{B,1} \\ q_{B,2} \\ q_{B,3} \end{pmatrix}$$

indicates a 3-dimensional vector $(q_{B,1}, q_{B,2}, q_{B,3})^T$ which is formed of three elements except the first element in rotation differential value B of FIG. 10.

$$\begin{pmatrix} q_{C,1} \\ q_{C,2} \\ q_{C,3} \end{pmatrix}$$

indicates a 3-dimensional vector formed of three elements except the first element in rotation differential value C of FIG. 10.

$$\begin{pmatrix} q_{B,1} \\ q_{B,2} \\ q_{B,3} \end{pmatrix} \cdot \begin{pmatrix} q_{C,1} \\ q_{C,2} \\ q_{C,3} \end{pmatrix}$$

indicates the inner product of two 3-dimensional vectors. If the inner product is a negative number, logical value B is defined as 'true', and otherwise it is defined as 'false'.

Logical expression C: $A_{TH} < 2 \cos^{-1}|q_{A,0}|$

Here, $q_{A,0}$ indicates the first element in rotation differential value A of FIG. 10, as described in logical expressions A and B. If the result of performing logical expression C using the absolute value of $q_{A,0}$ is greater than a predetermined constant $A_{TH}$, logical expression C is defined as 'true' and otherwise it is defined as 'false'. At this time, constant $A_{TH}$ is set to a value close to 0 (for example, 0.02) and may be set to an appropriate value depending on an actual operation.

Logical expression D: $A_{TH} < 2 \cos^{-1}|q_{B,0}|$

Here, $q_{B,0}$ indicates the first element in rotation differential value B of FIG. 10, as described in logical expressions A and B. If the result of performing logical expression D using the absolute value of $q_{B,0}$ is greater than a predetermined constant $A_{TH}$, logical expression D is defined as 'true' and otherwise it is defined as 'false'. At this time, constant $A_{TH}$ is set as in logical expression C.

Logical expression E: $A_{TH} < 2 \cos^{-1}|q_{C,0}|$

Here, $q_{C,0}$ indicates the first element in rotation differential value C of FIG. 10, as described in logical expressions A and B. If the result of performing logical expression E using the absolute value of $q_{C,0}$ is greater than a predetermined constant $A_{TH}$, logical expression E is defined as 'true' and otherwise it is defined as 'false'. At this time, constant $A_{TH}$ is set as in logical expression C.

If the AND operation is performed for the five obtained logical values as follows, the output of the determining unit 960 of FIG. 9 is generated.

Output of determining unit 960: (logical expression A) AND (logical expression B) AND (logical expression C) AND (logical expression D) AND (logical expression E)

If the logic value is 'true', the selecting unit 980 receives the output of the rotation direction saturating unit 970 and outputs the received signal. If the logic value is 'false', the selecting unit 980 receives the output of the quaternion rotation difference calculating unit 940 and outputs the received signal.

The operation of the rotation direction saturating unit 970 will now be explained. Referring to FIG. 11 again, in the case of area 1, rotation position information which the decoding unit received is $\hat{Q}_i$ and rotation position information which is input at present is $Q_i$, and therefore the decoding unit rotates the object clockwise. However, since according to the original rotation direction, the object rotates from $Q_{i-1}$ to $Q_i$, the object should rotate counterclockwise. Therefore, the rotation direction saturating unit 970 makes the object rotate from position $\hat{Q}_i$ in a direction the same as the original direction, that is, in a direction to a rotation position having the largest counterclockwise movement (the position marked with $\tilde{Q}_i$ in FIG. 11). That is, the rotation direction saturating unit 970 sets new rotation information with which the object can rotate to a position close to 180 degrees from position $\hat{Q}_i$. Accordingly, the rotation direction can be corrected as the original rotation direction and a rotation position error can be minimized. The operation of the rotation direction saturating unit 970 is expressed as the following equation 41:

$$Q_s = \begin{pmatrix} |\delta_T| \\ -\frac{1}{\sqrt{(q_{R,1})^2 + (q_{R,2})^2 + (q_{R,3})^2}} q_{R,1} \\ -\frac{1}{\sqrt{(q_{R,1})^2 + (q_{R,2})^2 + (q_{R,3})^2}} q_{R,2} \\ -\frac{1}{\sqrt{(q_{R,1})^2 + (q_{R,2})^2 + (q_{R,3})^2}} q_{R,3} \end{pmatrix} \quad (41)$$

Here, $(q_{R,0}, q_{R,1}, q_{R,2}, q_{R,3})_T$ indicates the quaternion rotation difference calculating unit 940 of FIG. 9, and $\delta_T$ is a constant close to 0 (for example, 0.001) and is determined with respect to the precision degree of encoding.

Figure 12:
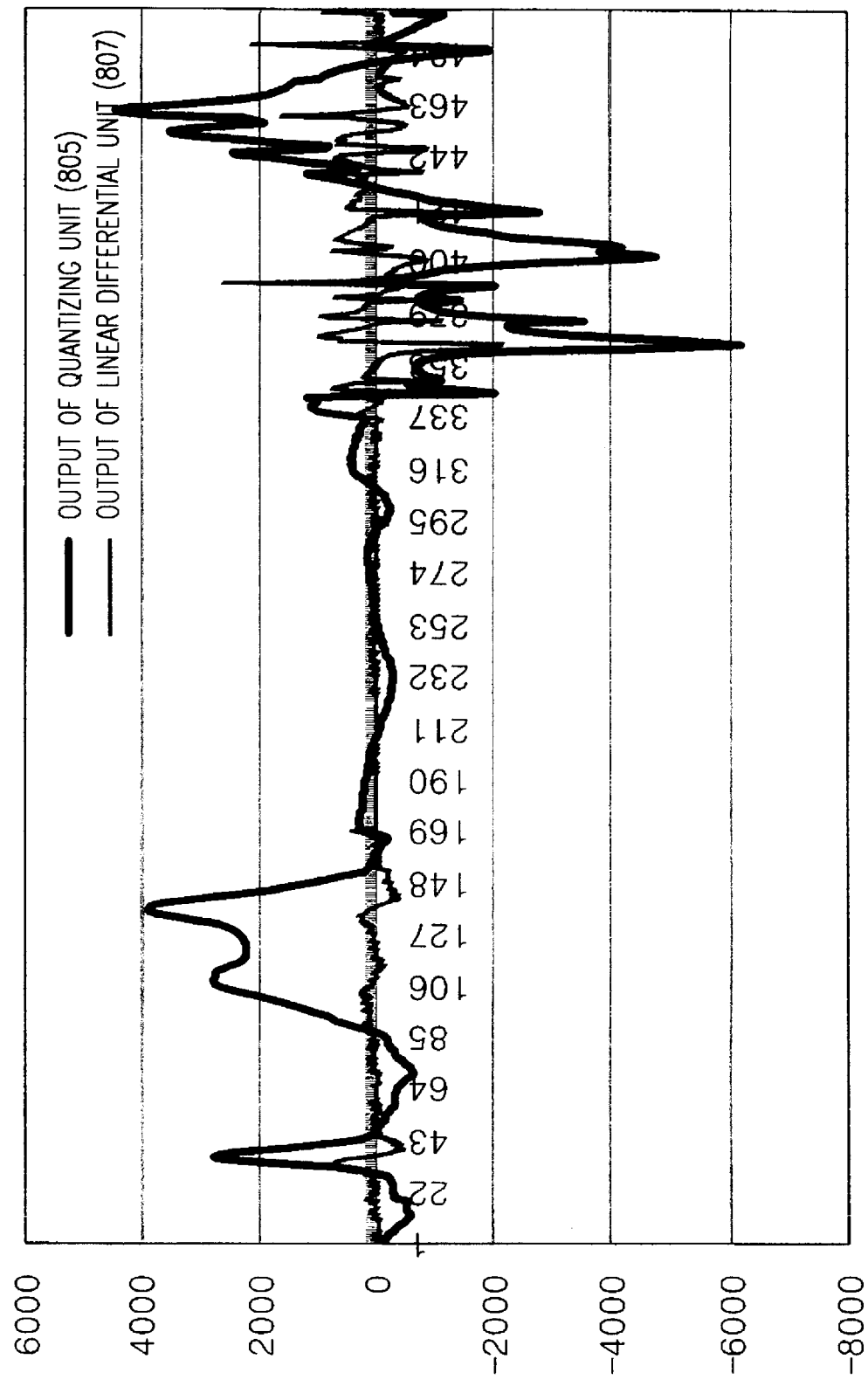

The linear differential unit 807 obtains the linear differential of successive quaternions of key values. That is, a value output from the linear/rotational differential unit 803 is quantized in the quantizing unit 805, and then the linear differential of the quantized value is obtained. By doing so, the redundancy of occurring data increases as shown in FIG. 12, and as a result higher encoding efficiency is achieved. Therefore, an effect similar to actually performing second order differentiation for key value data is obtained. As described in explaining the direction control of the linear/rotational differential unit 803, according to the prior art second order differential, the encoding is more lossy encoding than the encoding scheme of the present invention described above. Therefore, when the object rotates using decoded rotation information, the inverse rotation of the object occurs. As quantization errors increase, the inverse rotations occur more frequently. That is, the second order differential causes an increase in quantization errors, while the linear differential unit 807 disclosed in the present embodiment applies linear differentiation to the quaternion of already quantized key values and therefore increases data redundancy and prevents quantization errors from occurring.

The entropy encoding unit 809 improves encoding efficiency of data which is quantized using the arithmetic encoding method 809 for removing bit redundancy by calculating the frequency of symbol generation based on conditional probabilities. Accordingly, the amount of data to be actually encoded decreases effectively.

Based on the structure described above, the encoding method according to a second preferred embodiment will now be explained.

The encoding method according to the second embodiment is based on linear differentiation (DPCM) which uses the difference between a previously restored value and a value to be encoded at present as a key in field data of an orientation interpolator node. While for the key value data, key frames are removed within an allowable error limit using similarity of rotational transformation on a quaternion space, and differentiated values are obtained using rotation differentiation, and then the differentiated values are quantized, linearly differentiated, and arithmetic encoded. By doing so, encoding efficiency is improved and visual quality distortion of the restored result is objectively measured. The method will now be explained step by step.

Step 1: Field data of an orientation interpolator node to be encoded is received and parsed. More specifically, VRML data is received, the orientation interpolator node is parsed, and a key and key values are respectively extracted from the parsed value so as to encode field data formed with a key and key values.

Step 2: The key frame removing unit 802 selects some input key and key values from total input keys and key values within an allowable error limit.

Step 3: The linear/rotational differential unit 803 linearly differentiates input key data so that redundancy among these linearly differentiated data is generated, and the quantizing unit 805 quantizes the data.

Step 4: The linear/rotational differential unit 803 performs rotational differentiation for the input key value data.

Step 5: In order to compensate for quantization errors of key and key values to be input next time point, the differentiated values of the key and key values quantized in the quantizing unit 805 in steps 3 and 4 are inverse quantized in the inverse quantizing unit 806, delayed in the delay unit 819, and then accumulated in the linear/rotation integrating (or accumulating) unit 804. The accumulated key and key values are used in differential processing of a key and key values input at the next time point. Equations used for accumulation in the linear/rotational integrating unit 804 are give below as equations 42 and 43:

$$\hat{K}_{i-1} = \sum_{j=0}^{i-1} \tilde{K}_j \quad (42)$$

Here, $\tilde{K}_j$ denotes an inverse quantized differential key which occurs j-th.

$$\hat{Q}_{i-1} = \prod_{j=0}^{i-1} \tilde{Q}_j \quad (43)$$

Here, $\tilde{Q}_j$ denotes an inverse quantized differential key value which occurs j-th.

Step 6: The quantized key is input to the entropy encoding unit 809, arithmetic encoded, and streaming processed according to the format of services to be provided.

Step 7: The quantized key values are linearly differentiated in the linear differential unit 807, arithmetic encoded in the entropy encoding unit 809, and streaming processed. In streaming, it should be considered how to determine the structure of stream data according to formats and functions of streaming services. That is, data structure (a) shown in FIG. 6 is the simplest one for a case in which the real-time characteristic of services is not considered. In this structure, delay occurs in the decoding unit for the same time period as the time period in which a key is restored. Compared with data structure (b), data structure (a) causes lower encoding cost and higher decoding cost. Data structure (b) can provide real-time characteristics and additional functionality of data services. In data structure (b), immediately after a key and corresponding key values are restored, visualization is allowed. Data structure (b) is error resilient. That is, though current data has a loss, the loss can be restored to some degree with previous data and next data to be restored. Only by adjusting the encoding order of a key and key values in the entropy encoding unit 809, structures (a) and (b) of FIG. 6 can be made.

Step 8: Binary information which is input through the binary field data output unit 810 is decoded through an inverse of the encoding process excluding a step of the key frame removing unit 802. By measuring visual distortion of the decoded data in the distortion measuring unit 818, the performance of the encoding unit is evaluated. The decoding unit decodes data in the inverse process of the above-described encoding process.

FIG. 20 is an example in which the decoding process according to the second embodiment is expressed in bitstream syntax. When the decoding process as shown in FIG. 20 is finished, the distortion measuring unit 818 receives the output of the field data input unit of an orientation interpolator node 300 and the output of the field data output unit of an orientation interpolator node 817, and measures visual distortion in an objective number, using equation 30 or 33. Equations 30 and 33 used at this time are equations reflecting physical characteristics of rotation transformation of an object in a quarternion space, and provide measured values more objective and accurate than equation 1 used in the prior art.

Figure 21:
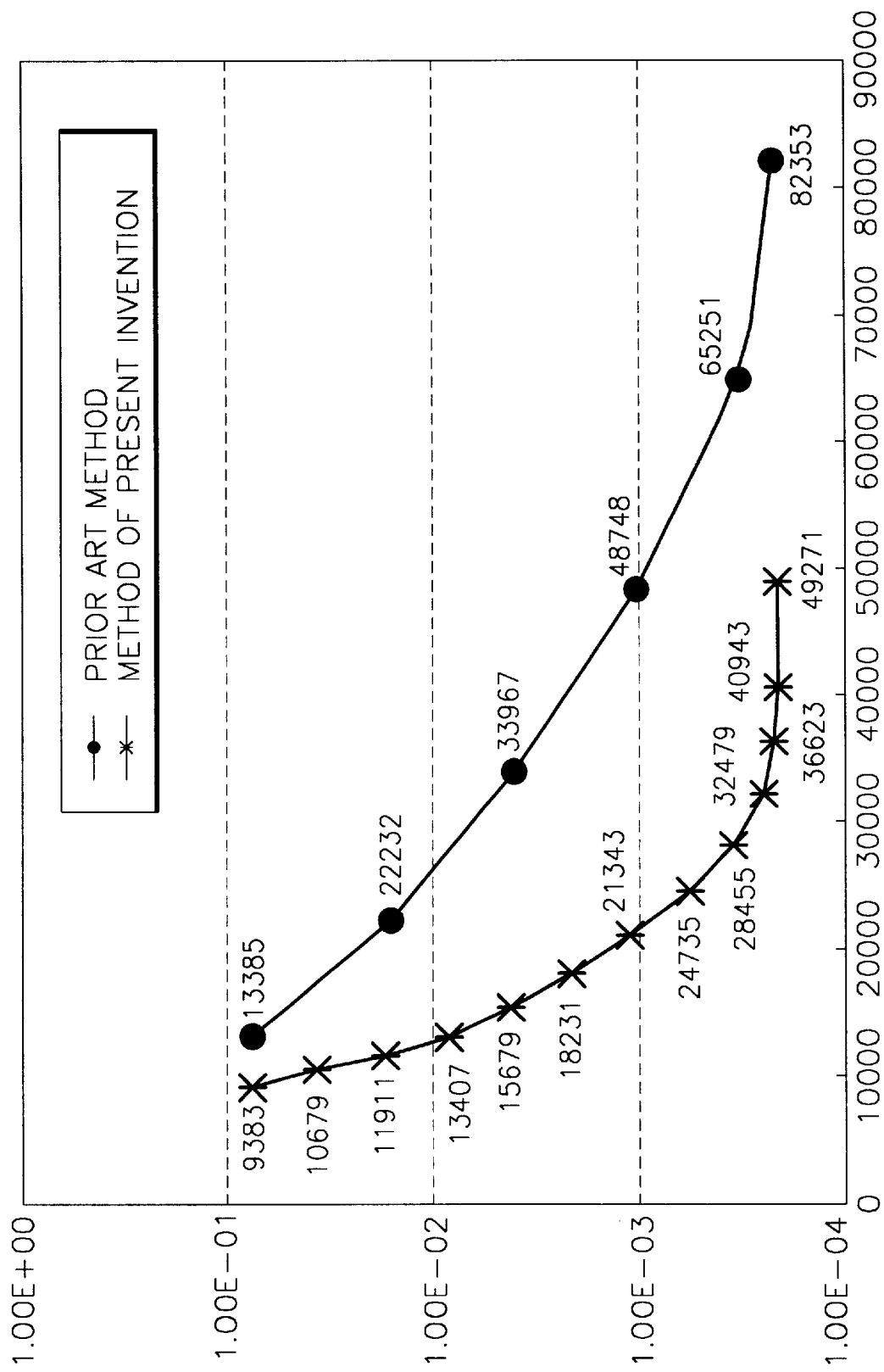
Figure 22:
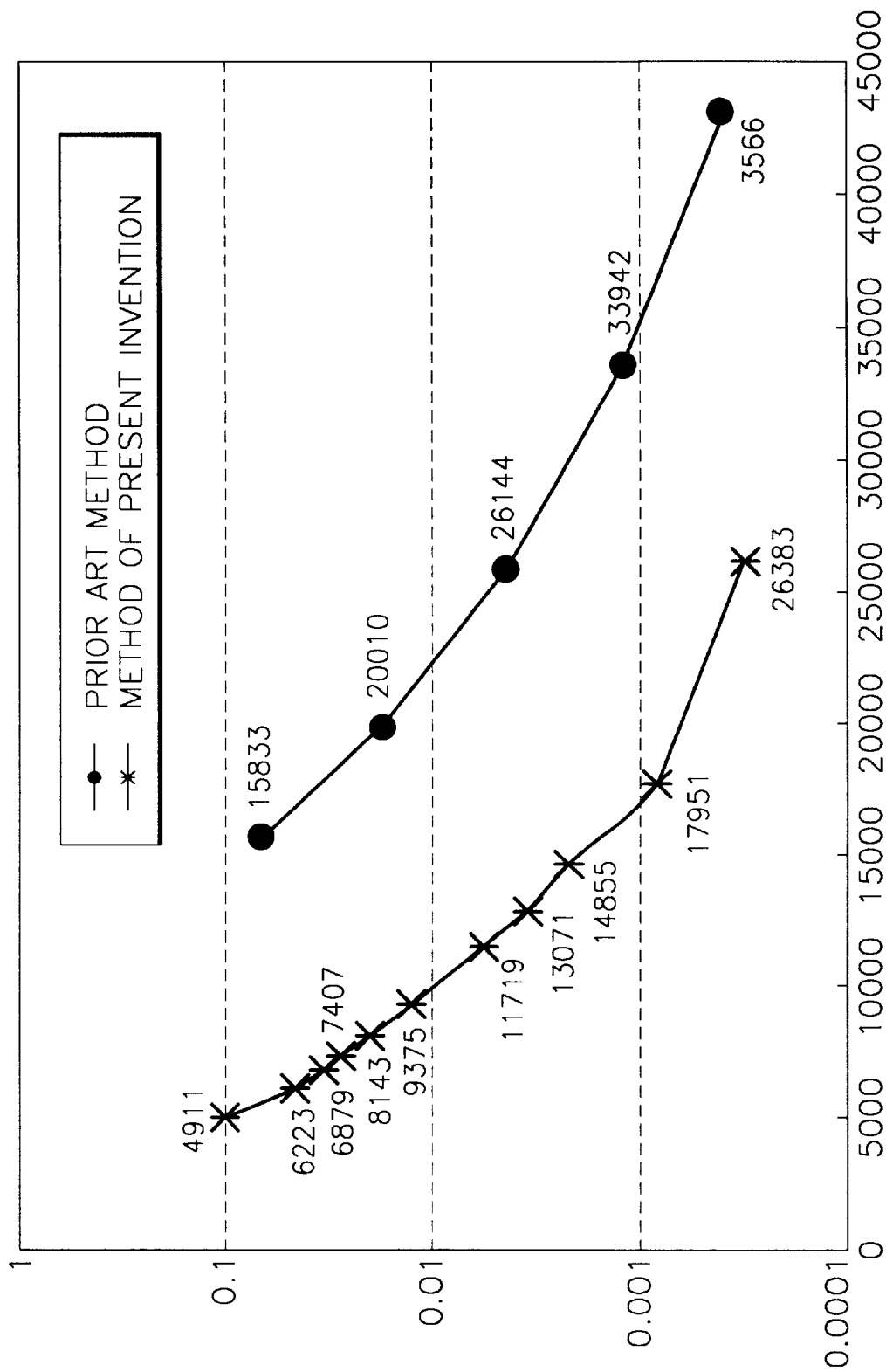

In encoding field data of an orientation interpolator node, the present embodiment, which implements the encoding method using the steps described above removes data redundancy in a time region and bit redundancy among quantized symbols, and improves data transmission efficiency by reflecting physical characteristics of rotation transformation. FIGS. 21 and 22 are graphs showing distortion rates (Rate-Distortion) of the animation encoding method of the prior art MPEG-4 BIFS and that of the preferred embodiment of the present invention. Referring to FIGS. 21 and 22, at the same error, the encoding method of the present embodiment generates a relatively very small number of bits.

As described above, in encoding field data of a orientation interpolator node, the present invention removes data redundancy in a time region and bit redundancy among quantized symbols, and improves data transmission efficiency by reflecting physical characteristics of a rotational and translational movement and removing additional information for elements.

What is claimed is:

1. An encoding apparatus for an orientation interpolator node which provides information on the rotation of an object in a 3-dimensional space, the encoding apparatus comprising:
   a field data input unit for extracting field data to be encoded at present from a key which indicates information on a position on a time axis where a change of rotational and translational movement occurs and key values which indicate rotation information corresponding to the position information, by parsing the orientation interpolator node;
   an adaptive differential pulse code modulation (ADPCM) processing unit for converting the key value data into a quaternion, and then ADPCM processing the quaternion using rotation differentiation, and differential pulse code modulation (DPCM) processing for the key data; and
   a quantizing unit for quantizing the key data and key value data and outputting the quantized data.

2. The encoding apparatus for an orientation interpolator node of claim 1, wherein the ADPCM processing unit comprises:
   a quaternion converting unit for converting the key value data extracted by the field data input unit into a quaternion;
   a DPCM unit for calculating a difference value between a previously restored key and a key to be encoded at present for the key data extracted in the field data input unit; and
   a rotation differential converting unit for producing a rotation differential converting matrix in which the key value data converted into a quaternion is represented by a shortest rotational movement distance of the object, and, when new key value data is generated based on the rotation differential converting matrix, making the differential code converting unit reflect the generation of key data corresponding to the new key value data.

3. The encoding apparatus for an orientation interpolator node of claim 2, wherein the rotation differential converting unit comprises:
   a rotation differential converting matrix generating unit for producing a rotation differential converting matrix which is a product of key value data to be encoded at present and complex conjugated data obtained by accumulating rotation differential converting matrices which are previously restored;
   an element adjusting unit for redefining the rotation differential converting matrix so as to satisfy a condition that the value of the first element of a quaternion is always the largest in all the elements of the quaternion, and outputting the rotation differential converting matrix;
   a delay unit for storing a rotation differential converting matrix which is restored at present in response to the output from the element adjusting unit, and providing a rotation differential converting matrix which is restored and stored previously; and
   an accumulating unit for sequentially receiving rotation differential converting matrices, which are previously stored, from the delay unit, and outputting data obtained by accumulating the rotation differential converting matrices which are restored previously.

4. The encoding apparatus for an orientation interpolator node of claim 3, wherein the element adjusting unit comprises:
   a condition unit for determining whether or not the value of the first element of a quaternion is the largest among all the elements of the rotation differential converting matrix; and
   a key value generating unit for generating new key value data by arbitrarily defining a rotation position which may have a shortest rotational movement distance of the object if the determination of the condition unit indicates that the value of the first element is not the largest, and making the DPCM unit reflect the generation of key data corresponding to the new key value data.

5. The encoding apparatus for an orientation interpolator node of claim 1, further comprising:
   an entropy encoding unit for arithmetic encoding quantized key and key value data.

6. The encoding apparatus for an orientation interpolator node of claim 5, further comprising:
   an output unit for outputting the arithmetic encoded data as binary format stream data,
   wherein in the structure of stream data, key data and key value data are separately formed.

7. The encoding apparatus for an orientation interpolator node of claim 6, further comprising:
   an output unit for outputting the arithmetic encoded data as binary format stream data, wherein in the structure of stream data, key data and key value data form a unit pair sequentially.

8. The encoding apparatus for an orientation interpolator node of claim 1, further comprising:

a distortion measuring unit for, measuring visual quality distortion of restored data from original information when output data is restored, before encoding with respect to rotation differential values.

9. An encoding method for an orientation interpolator node which provides information on the rotation of an object in a 3-dimensional space, the encoding method comprising the steps of:

(a) extracting field data to be encoded at present from a key which indicates information on a position on a time axis where a change of rotational and translational movement occurs and key values which indicate rotation information corresponding to the position information, by parsing the orientation interpolator node;

(b) converting the key value data into a quaternion, and then adaptive differential pulse code modulation (ADPCM) processing the quaternion using a rotation differential converting matrix, and differential pulse code modulation (DPCM) processing the key data; and (c) quantizing the key data and key value data and outputting the quantized data.

10. The encoding method for an orientation interpolator node of claim 9, wherein step (b) comprises the steps of:

(b1) converting the key value data extracted in step (a) into a quaternion;

(b2) producing a rotation differential converting matrix in which the key value data converted into a quaternion is represented by a shortest rotational movement distance of the object;

(b3) when new key value data is generated based on the rotation differential converting matrix, generating key data corresponding to the new key value data; and (b4) for the key data extracted in step (a) and key data generated in step (b3), calculating a difference value of a previously restored key and a key to be encoded at present.

11. The encoding method for an orientation interpolator node of claim 10, wherein in step (b2) the rotation differential converting matrix ($Q_i'$) is defined by the following equation 6:

$$Q'_i = Q_i * Q^*_{i-1} \quad (6)$$

Here, $Q_i$ denotes key value data which is converted into a quarternion and to be encoded at present, and $Q^*_{i-1}$ denotes conjugate of data which is obtained by accumulating rotation differential converting matrices previously restored.

12. The encoding method for an orientation interpolator node of claim 10, after step (b2) further comprising the steps of:

(b2-1) determining whether or not the condition that the value of the first element of a quaternion is always the largest in all the elements of the quaternion(=rotation differential converting matrix) is satisfied;

(b2-2) redefining the rotation differential converting matrix and outputting the rotation differential converting matrix to step (c) if the condition is not satisfied; and (b2-3) outputting the rotation differential converting matrix without change if the condition is satisfied.

13. The encoding method for an orientation interpolator node of claim 12, wherein in step (b2-2), if the condition is not satisfied, the rotation differential converting matrix is redefined by generating new key value data using the following equation 7:

$$|A| = |B| = |P| = 1 \quad (7)$$

$$A \cdot B = \cos\Omega$$

$$P = A\frac{\sin(\Omega - \theta)}{\sin\Omega} + B\sin\frac{\theta}{\sin\Omega}$$

Here, P denotes new key value data, B denotes the original key value data to be encoded at present, A denotes previous key value data, $\Omega$ denotes the rotation angle between A and B, and $\theta$ denotes the rotation angle between A and P.

14. The encoding method for an orientation interpolator node of claim 10, wherein in step (b3), the new key data is generated using the following equation 9:

$$K_i = K_{i-1} + (K_i - K_{i-1}) * \frac{\theta}{\Omega} \quad (9)$$

Here, $K_i$ denotes key data to be encoded at present, $K_{i-1}$ denotes previous key data, $\Omega$ denotes the rotation angle between previous key value data and the original key value data to be encoded at present, and $\theta$ denotes the rotation angle between previous key value data and the new key value data.

15. The encoding method for an orientation interpolator node of claim 9, further comprising the step of:

(d) arithmetic encoding quantized key and key value data.

16. The encoding method for an orientation interpolator node of claim 15, further comprising the step of:

(e) outputting arithmetic encoded data as binary format stream data, wherein in the structure of stream data, key data and the key value data are separately formed.

17. The encoding method for an orientation interpolator node of claim 15, further comprising the step of:

(e) outputting arithmetic encoded data as binary format stream data, wherein in the structure of stream data, key data and the key value data form a unit pair sequentially.

18. The encoding method for an orientation interpolator node of claim 9, after step (c) further comprising the step of:

when output data is restored, measuring visual quality distortion of restored data from original information before encoding with respect to rotation differential values.

19. The encoding method for an orientation interpolator node of claim 18, wherein RMS($D_m$) of a quantization error and the maximum error ($D_p$) which are bases for measuring the visual quality distortion are calculating using the following equations 15 or equations 16:

$$\theta'' = 2\cos^{-1} q_0'' = 2\cos^{-1}(Q' \cdot Q), \theta'' \in [0, \pi] q_0'' = Q' \bullet Q, \quad (15)$$

(• indicates inner product operation)

$$\begin{cases} D_m = \sqrt{\frac{8}{3}} \sin\frac{|\theta''|}{2} = \sqrt{\frac{8}{3}} \sin\{|\cos^{-1}(Q' \cdot Q)|\} \\ D_p = 2\sin\frac{|\theta''|}{2} = 2\sin\{|\cos^{-1}(Q' \cdot Q)|\} \end{cases}$$

$$\begin{cases} D_m = \sqrt{\frac{8\{1 - (Q' \cdot Q)^2\}}{3}} \\ D_p = \sqrt{4\{1 - (Q' \cdot Q)^2\}} \end{cases} \quad (16)$$

Here, Q denotes key value data of information before encoding, the key value data which is converted into a quaternion, and Q' denotes key value data of decoded information, the key value data which is converted into a quaternion.

20. An encoding apparatus for encoding rotation information including rotation time, rotation axes, and rotation angle which are needed to rotate a 3-dimensional object in a 3-dimensional space, the encoding apparatus comprising:

a quaternion converting unit for converting an input key value into a quaternion expression value which is expressed by one real number and three imaginary numbers;

a key frame removing unit for selecting some input keys and the key values from the total keys and key values within an allowable error limit;

a linear/rotational differential unit for linear differential processing the selected key and rotational differential processing the selected key values;

a quantizing unit for quantizing differential processed key and key values;

an inverse quantizing unit for inverse quantizing the differential values of the quantized key and key values in order to compensate for quantization errors of key and key values which are input at the next time point;

a linear/rotational integrating(or accumulating) unit for accumulating inverse quantized key and key values;

a linear differential unit for linear differential processing the quantized key values; and an entropy encoding unit for arithmetic quantizing key and key values.

21. The encoding apparatus of claim 20, wherein the linear/rotational differential unit performs rotation transformation for a next position of the object after a rotational movement from the current position, by obtaining a rotation differential between key values corresponding to continuous keys through a rotation differential equation in a quaternion space as the following equation 38:

$$Q'_i = Q_i * Q^*_{i-1} \quad (38)$$

22. The encoding apparatus of claim 20, wherein the linear/rotational differential processing unit includes a rotation direction correction unit for performing a rotation direction correction function which makes the object rotate in the same direction as the rotation direction indicated by the original rotation information.

23. The encoding apparatus of claim 22, wherein the rotation direction correction unit comprises:

a rotation direction saturating unit for generating saturated rotation information and outputting the information;

a determining unit for determining whether or not the rotation direction changed; and a selecting unit for selectively receiving and outputting the output of the linear/rotational differential unit or the output of the rotation direction saturating unit, based on the result of determining by the determining unit.

24. The encoding apparatus of claim 23, wherein when the result of determining by the determining unit indicates that the rotation direction changed, the selecting unit receives and outputs the output of the rotation direction saturating unit instead of a rotation differential value output from the linear/rotational differential processing unit, and otherwise the selecting unit receives and outputs a rotation differential value output from the linear/rotational differential processing unit.

25. An encoding method for encoding rotation information after receiving a key and key values, the encoding method comprising the steps of:

(a) obtaining a linear differential value by linear differential processing a selected key and obtaining rotation differential values by rotational differentiating selected key values; and (b) in order to reduce the number of bits to be encoded, encoding only three components excluding the first component in four components forming the rotation differential value, and decoding the remaining first component using the three components which are decoded in a decoding unit using the following equation 39:

$$\hat{q}_0 = \sqrt{1 - (\hat{q}_1^2 + \hat{q}_2^2 + \hat{q}_3^2)} \quad (39)$$

* * * * *